United States Patent [19]

Murakami et al.

[11] Patent Number: 5,452,272
[45] Date of Patent: Sep. 19, 1995

[54] MAGNETO-OPTICAL RECORDING AND REPRODUCING DEVICE HAVING LIGHT INTERRUPTING FORMING MAIN ROBE AND SIDE ROBE LIGHT BEAM PORTIONS

[75] Inventors: Yoshiteru Murakami, Nishinomiya; Junsaku Nakajima, Yamatotakada; Akira Takahashi, Nara; Kenji Ohta, Kitakatsuragi, all of Japan

[73] Assignee: Sharp Kabushiki Kaisha, Osaka, Japan

[21] Appl. No.: 175,748

[22] Filed: Dec. 30, 1993

[30] Foreign Application Priority Data

Jan. 7, 1993 [JP] Japan .................................. 5-001380

[51] Int. Cl.⁶ .............................................. G11B 11/00
[52] U.S. Cl. ........................................ 369/13; 369/288; 428/694 EC; 360/114
[58] Field of Search ..................... 369/13, 275.2, 288, 369/14, 275.3, 110, 116; 360/114, 59, 131; 365/122; 428/694 MM, 694 EC

[56] References Cited

U.S. PATENT DOCUMENTS

5,278,810 1/1994 Takahashi et al. ..................... 369/13

OTHER PUBLICATIONS

"Superresolution Optical Head Technics", (O plus E, 1992-9, No. 154, pp. 81 to 83, issued on Sep. 5, 1992 by New Technical Communications Ltd.).
"Read Out Mechanism of Magnetically Induced Super Resolution", (Proceedings of Magneto-Optical Recording International Symposium '91, *J. Magn. Soc. Jpn.*, vol. 115, Supplement No. S1 (1991), pp. 319–322).

*Primary Examiner*—Ali Neyzari
*Attorney, Agent, or Firm*—David G. Conlin; Kevin J. Fournier

[57] ABSTRACT

A magneto-optical recording and reproducing device is provided with a magneto-optical disk for reproducing recorded information using light, a semiconductor laser, an objective lens for converging a light beam emitted from the semiconductor laser onto the magneto-optical disk and a light interrupting member for interrupting a portion of a light beam before it is incident on the objective lens. The magneto-optical disk is composed of a readout layer which is predominant in in-plane magnetization, and in which a transition occurs to be predominant in perpendicular magnetization as temperature thereof is raised and a recording layer for recording thereon information using a perpendicular magnetization. In this arrangement, since the light interrupting member is provided, a light spot can be made smaller, thereby improving a recording density. Moreover, even when temperature of the readout layer is raised due to a side robe generated by the light interrupting member, in-plane magnetization is maintained in the readout layer. Thus, interference by unwanted reproducing signals due to the side robe can be prevented, thereby improving a reproducing signal quality.

20 Claims, 24 Drawing Sheets

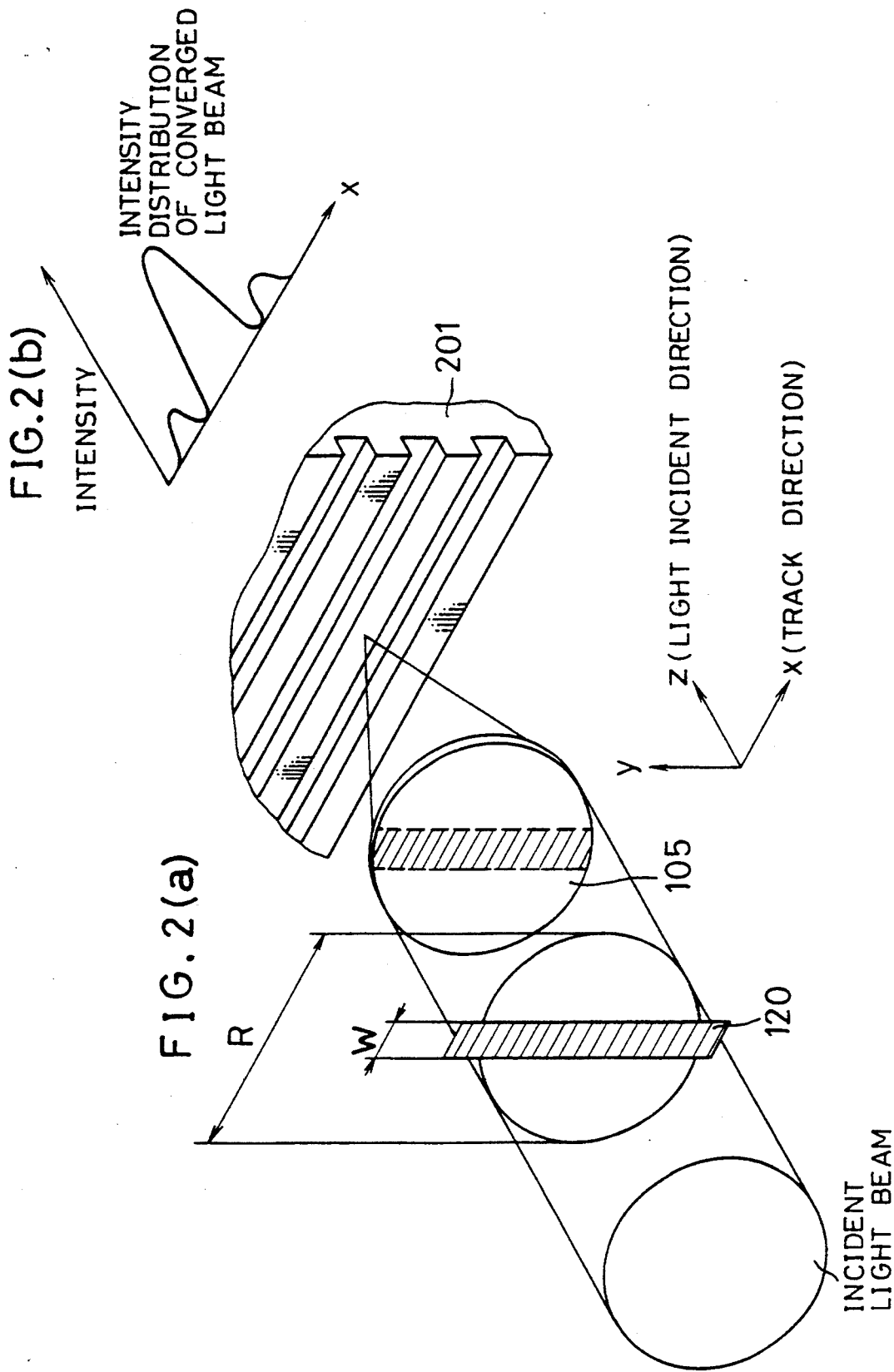

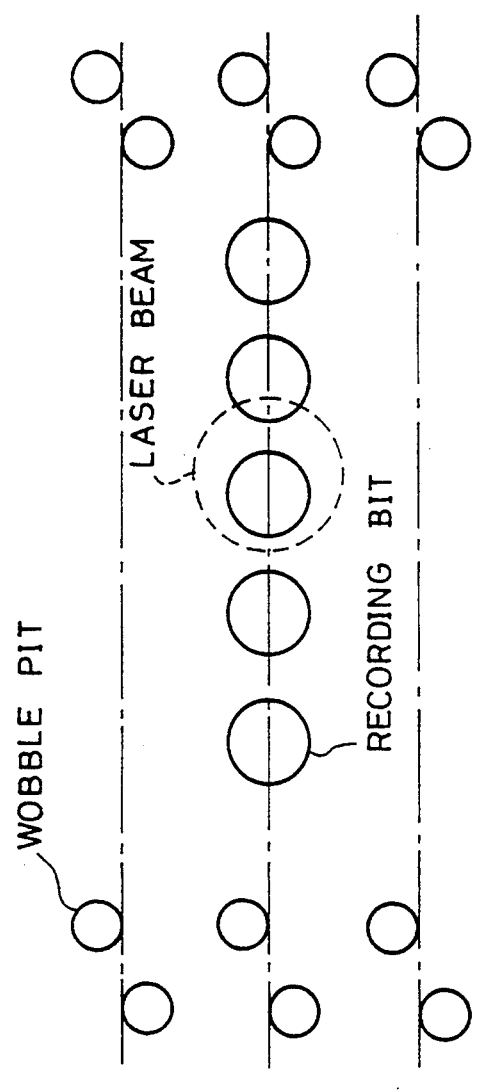

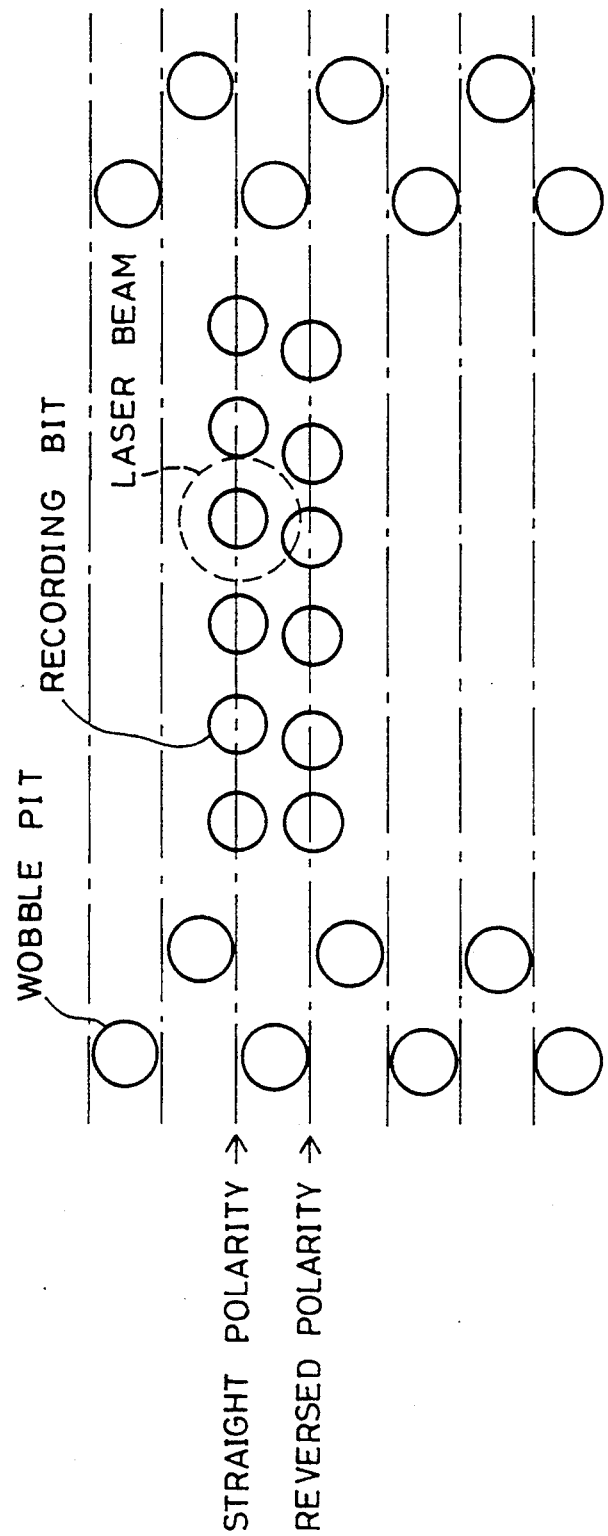

LASER BEAM INTENSITY

MAGNETO-OPTICAL RECORDING AND REPRODUCING DEVICE HAVING LIGHT INTERRUPTING FORMING MAIN ROBE AND SIDE ROBE LIGHT BEAM PORTIONS

FIELD OF THE INVENTION

The present invention relates to a magneto-optical recording device for recording and reproducing on and from a magneto-optical recording medium such as a magneto-optical disk, a magneto-optical tape, a magneto-optical card, etc.

BACKGROUND OF THE INVENTION

Research and development on magneto-optical disks have been intensified as being rewritable optical disks, and some of the magneto-optical disks have been already practically used as external memory designed for computers.

In the magneto-optical disk, a magnetic thin film with perpendicular magnetization is used as a recording medium, and a light is used in recording and reproducing. Thus, compared with a floppy disk or a hard disk wherein a magnetic thin film with in-plane magnetization is used, the magneto-optical disk has a larger recording capacity.

In the magneto-optical disk, a still higher recording density can be obtained by making shorter the diameter of the light spot. A shorter diameter of the light spot is obtained, for example, by making shorter the wavelength of the light beam, or by making larger the number of aperture (NA) of the objective lens. Alternatively, a shorter diameter of the light spot may be obtained with the use of a light interrupting plate for interrupting a central portion of the light beam before it is incident on an objective lens.

However, in practice, it is difficult to make an oscillating wavelength of a laser beam from a semiconductor laser (light source) shorter. Thus, this method presents the problem in that a higher recording density of the magneto-optical disk cannot be obtained.

On the other hand, in the method of making larger the N.A., if the optical axis of the optical system is tilted with respect to the magneto-optical disk, the light spot diameter becomes larger than that obtained in the conventional method. Thus, in this method, the problem is presented in that a more precise adjustment in assembling the magneto-optical disk drive and in the permissible level of the warpage of the magneto-optical disk is required compared with the case of the conventional method.

Furthermore, in the method of using the light interrupting plate, the diameter of the central portion of the light spot, which has a high intensity can be made shorter. However, since a side robe is generated, a portion having a relatively high intensity is formed so as to surround the central portion. Thus, interference by reproducing signals from the portion surrounding the central portion into reproducing signals from the central portion occurs, thereby lowering the quality of the reproducing signal.

In order to counteract the above problems, another method has been proposed, wherein a reflected light from the recording medium is converged onto a slit, and only the central portion of the spot of the reflected light is derived. However, in practice, a new problem is presented in that the structure of an optical system in the magneto-optical disk drive becomes complicated.

SUMMARY OF THE INVENTION

An object of the present invention is to provide a magneto-optical recording and reproducing device which permits a simplified structure, an improvement in a reproducing signal quality and a recording density.

In order to achieve the above object, the magneto-optical recording device in accordance with the present invention is characterized by comprising:
- a magneto-optical recording medium for recording and reproducing information using a light;
- a light source for producing a light beam;
- an objective lens for converging a light beam emitted from the light source; and
- a light interrupting member for interrupting a portion of the light beam emitted from the light source before it is incident onto the objective lens,
- wherein the magneto-optical recording medium includes:
  - a readout layer which is predominant in in-plane magnetization at room temperature, and in which a transition occurs to be predominant in perpendicular magnetization as a temperature thereof is raised; and
  - a recording layer for recording thereon information using a perpendicular magnetization.

In the above arrangement, in reproducing information, when a light beam is projected onto the readout layer, the temperature distribution in the portion irradiated with a light beam is like a Gaussian distribution. Thus, the temperature of the central portion of the light spot formed on the readout layer is heated to a higher temperature than the peripheral portion.

As the temperature thereof is raised, a transition occurs in the heated portion from in-plane magnetization to perpendicular magnetization. Here, by the exchange coupling force exerted between the readout layer and the recording layer, the magnetization direction in the readout layer is arranged in the magnetization direction in the recording layer.

As a transition occurs in the heated area from in-plane magnetization to perpendicular magnetization, polar Kerr effect is shown only in the heated area, thereby reproducing information based on a reflected light from the heated area.

On the other hand, since the temperature of the readout layer outside the central portion of the light spot is lower than the central portion, the in-plane magnetization is maintained. Therefore, the polar Kerr effect is not shown in the portion, thus the portion is not subjected to reproduction.

When a spot of the light beam is shifted so as to reproduce the next recording bit, the temperature of the previously reproduced portion drops. Therefore, a transition occurs in the portion having a temperature drop from perpendicular magnetization to in-plane magnetization, and the polar Kerr effect is no longer shown in the portion. This means that the information in the form of a magnetization direction recorded on the recording layer is masked by the in-plane magnetization in the readout layer.

Furthermore, in the above arrangement, since the light interrupting plate is provided, a size of the central portion of the light spot, which has a high intensity, can be made smaller. Therefore, reproduction of the information recorded at high density is permitted, thereby achieving a significant improvement in the recording density.

Moreover, even if a side robe is generated by the light interrupting plate, and thus a portion having a relatively high intensity of light is formed so as to surround the center of the light spot, the in-plane magnetization is maintained in the readout layer in the portion corresponding to the peripheral portion of the light spot. Therefore, interference by reproducing signals from the peripheral portion surrounding the center of the light spot into reproducing signals from the central portion of the light spot can be eliminated, thereby improving a reproducing signal quality.

For a fuller understanding of the nature and advantages of the invention, reference should be made to the ensuring detailed description taken in conjunction with the accompanying drawings.

BRIEF DESCRIPTION OF THE DRAWINGS

FIG. 2(a) is a perspective view which shows relative positions between a light interrupting plate and grooves formed on a magneto-optical disk in the magneto-optical disk device of FIG. 1.

FIG. 2(b) is a graph which shows a light intensity distribution of a magneto-optical disk by the light interrupting plate in the magneto-optical disk of FIG. 1.

FIG. 21 is an explanatory view showing an example of an arrangement of a wobble pit formed on the substrate of the magneto-optical disk of FIG. 4.

FIG. 22 is an explanatory view showing another example of an arrangement of a wobble pit formed on the substrate of the magneto-optical disk of FIG. 4.

DESCRIPTION OF THE EMBODIMENTS

[EMBODIMENT 1]

The following description will discuss the first embodiment of the present invention in reference to FIGS. 1 through 31.

Figure 1:
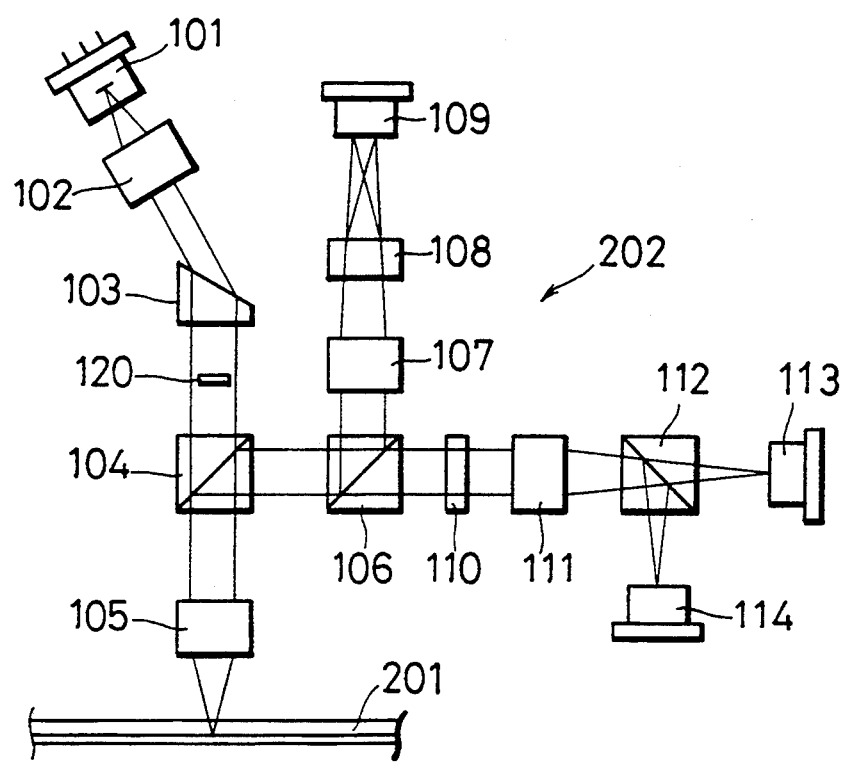
FIG. 1 which shows the first embodiment is a view showing a schematic configuration of a magneto-optical disk device.

As shown in FIG. 1, the magneto-optical disk device (magneto-optical recording and reproducing device) of the present embodiment is composed of a magneto-optical disk 201 (magneto-optical recording medium) and an optical head 202 for projecting a light beam onto a magneto-optical disk 201.

As an optical system, the optical head 202 is composed of a semiconductor laser 101 (light source), a collimating lens 102, a shaping prism 103 for shaping the cross-section of the light beam into a circular shape, a light interrupting plate 120 (light interrupting means) for interrupting a portion of the light beam in a circular shape, a beam splitter 104 and an objective lens 105 for converging a light beam transmitted through the beam splitter 104 onto the magneto-optical disk 201.

The optical head 202 is further provided with a beam splitter 106, and a light beam converged by the objective lens 105 is reflected by the beam splitter 104 and reflected from the magneto-optical disk 201. The reflected light from the magneto-optical disk 201 is divided into a transmitted light and a reflected light which are respectively directed to the servo system and the reproducing system.

The servo system is composed of a light receiving element 109, a lens 107 and a cylindrical lens 108. The receiving element 109 is provided for taking out the focus servo signal and the radial servo signal. The lens 107 is provided for converging a light reflected from the beam splitter 106 to be converged on the light receiving element 109. The cylindrical lens 108 is provided between the lens 107 and the light receiving element 109.

The reproducing system is composed of light receiving elements 113 and 114, a lens 111, a ½ wavelength plate 110 and a polarizing beam splitter 112. The light receiving elements 113 and 114 are provided for taking out a reproducing signal. The lens 111 is provided for converging a light transmitted through the beam splitter 106 onto the light receiving elements 113 and 114. The ½ wavelength plate 110 is provided between the beam splitter 106 and the lens 111. The polarizing beam splitter 112 divides a light transmitted through the lens 111 into a transmitted light and a reflected light and directs to the light receiving elements 113 and 114 respectively.

As shown in FIGS. 2(a) and 2(b), the light interrupting plate 120 is provided so that the lengthwise direction thereof forms a right angle with respect to the direction of the groove formed on the magneto-optical disk. In this arrangement, a pair of side robes generated on both sides of the main robe in the light converged by the objective lens 105 are arranged in the direction of the grooves. The ratio of the width (w) of the light interrupting plate 120 and a light beam diameter (R) to be incident on the objective lens 105 is set around 0.2.

Figure 3A:
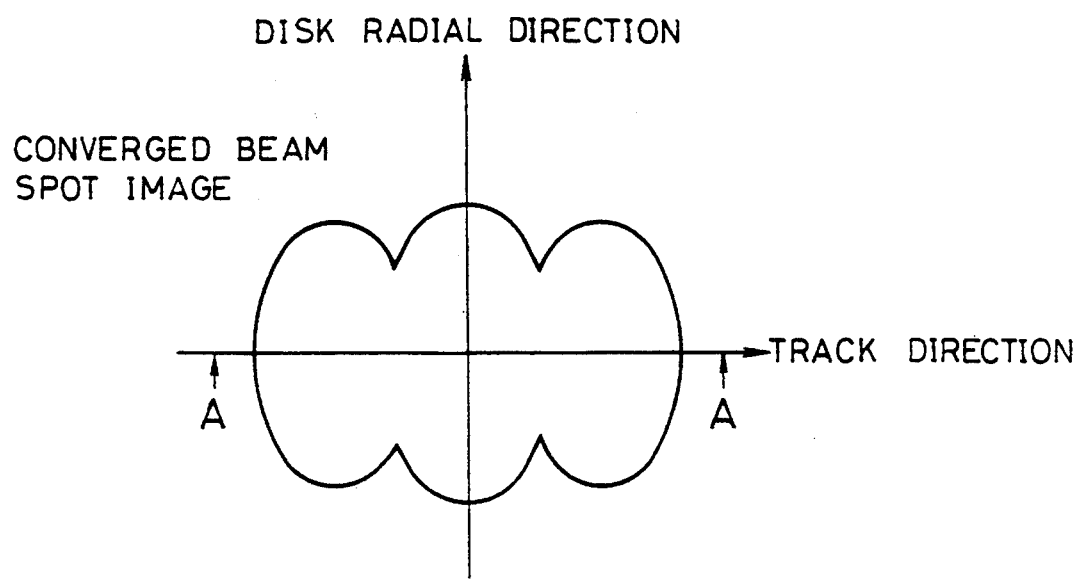
FIG. 3(a) is an explanatory view which shows a shape and an intensity of a light spot formed on the magneto-optical disk in the magneto-optical disk device of FIG. 1.
Figure 3B:
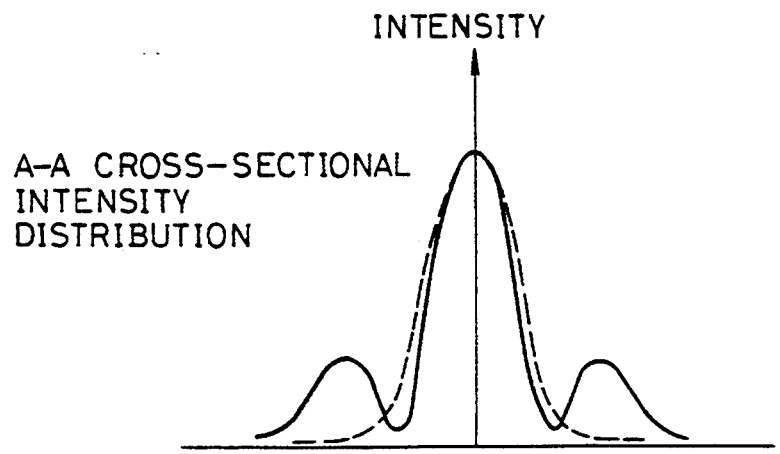
FIG. 3(b) is a graph which shows the light intensity distribution of a light spot formed on the magneto-optical disk in the magneto-optical disk device of FIG. 1.

As shown in FIGS. 3(a) (b), a light spot formed on the magneto-optical disk 201 has a central portion having a high intensity (main robe) and portions having relatively high intensity (side robes), which are arranged in a groove direction (i.e., the lengthwise direction of the track). Additionally, the dotted line in FIG. 3(b) shows the light intensity distribution of a light spot in the case where the light interrupting plate 120 is not provided.

Figure 4:
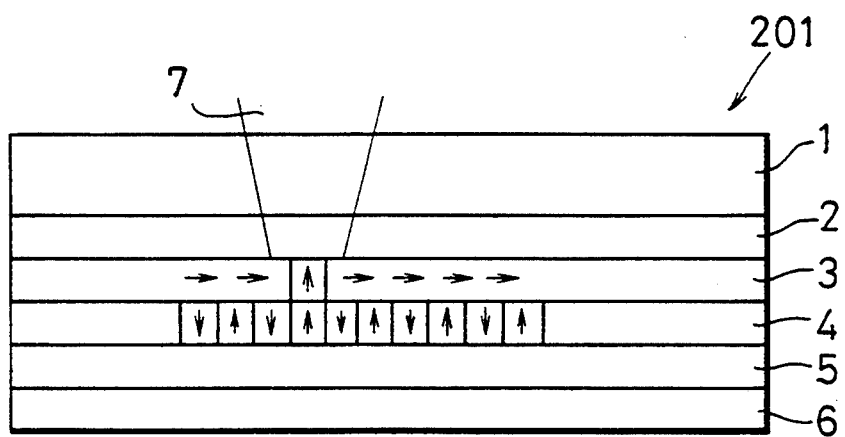
FIG. 4 is a view which shows a schematic configuration of the magneto-optical disk to be provided in the magneto-optical disk device of FIG. 1.

As shown in FIG. 4, the magneto-optical disk 201 of the present embodiment is composed of a substrate 1 (base) whereon a transparent dielectric film 2, a readout layer 3, a recording layer 4, a protective film 5 and an overcoat film 6 are laminated in this order. The substrate 1 has a property that a light can be transmitted through the substrate 1.

Figure 5:
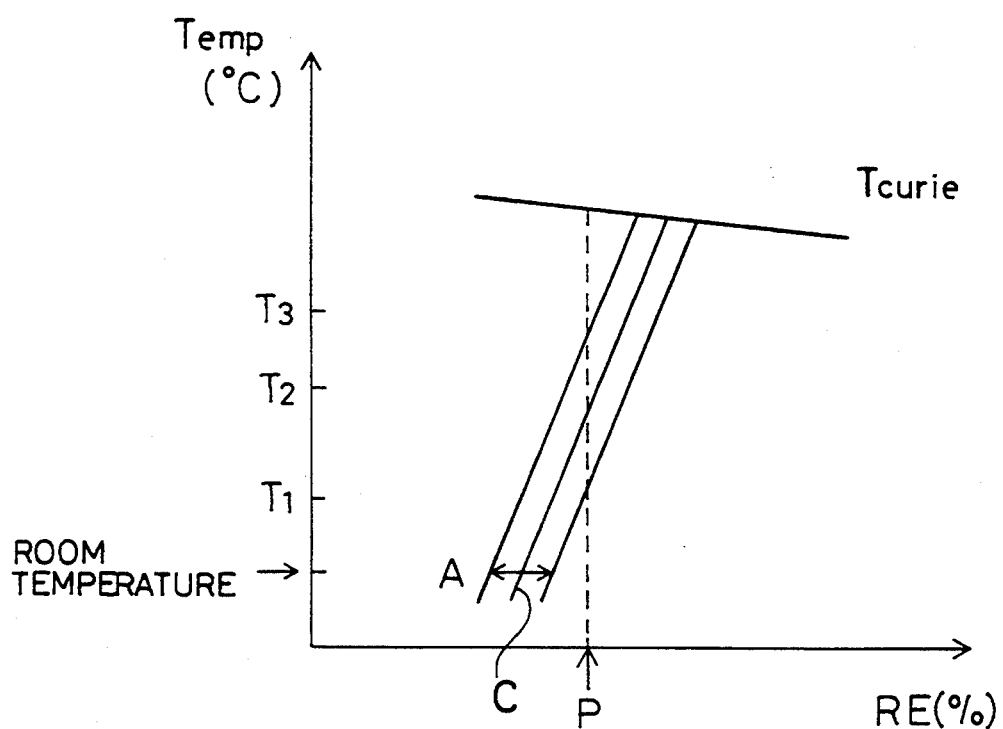
FIG. 5 is a magnetic phase diagram of a readout layer in the magneto-optical disk of FIG. 4.

As shown in the magnetic phase diagram of FIG. 5, a composition range where rare-earth transition metal alloy used in the readout layer 3 has perpendicular magnetization (shown by A in the figure) is extremely narrow. This is because the perpendicular magnetization appears only in the vicinity of a compensating composition (shown by C in the figure) where the magnetic moment of the rare-earth metal and the magnetic moment of the transition metal balance with one another. In FIG. 5, x-axis indicates the content of rare-earth metal, and y-axis indicates temperature.

The respective magnetic moments of the rare-earth metal and the transition metal have mutually different temperature dependencies. Specifically, the magnetic moment of the transition metal is greater than that of the rare-earth metal at high temperature. Thus, the composition of alloy is set such that the content of the rare-earth metal is greater than that in the compensating composition at room temperature so that the alloy does not have perpendicular magnetization at room temperature but has in-plane magnetization (as indicated by P in FIG. 5). When a light beam is projected, as the temperature of the portion irradiated with the light beam is raised, the magnetic moment of the transition metal becomes greater until it balances with that of the rare-earth metal, thereby having perpendicular magnetization shown by C in the figure.

FIG. 6 through FIG. 9 show one example of the hysteresis characteristic of the readout layer 3. In the figures, x-axis indicates an external magnetic field (Hex) to be applied perpendicularly onto the surface of the readout layer 3, and y-axis indicates polar Kerr rotation angle ($\theta$k) when a light beam is incident perpendicularly on the surface of the readout layer 3.

Figure 6:
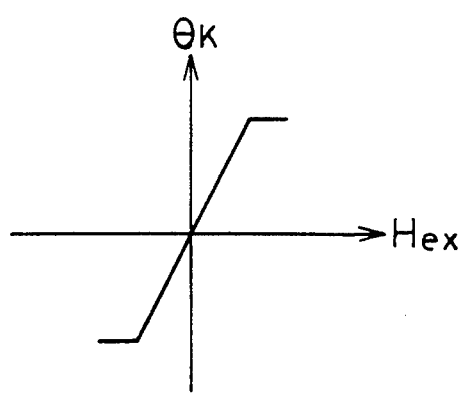
FIG. 6 is an explanatory view showing a relationship between an external magnetic field to be applied onto the readout layer and a polar Kerr rotation angle in a range of room temperature–$T_1$ of FIG. 5.
Figure 7:
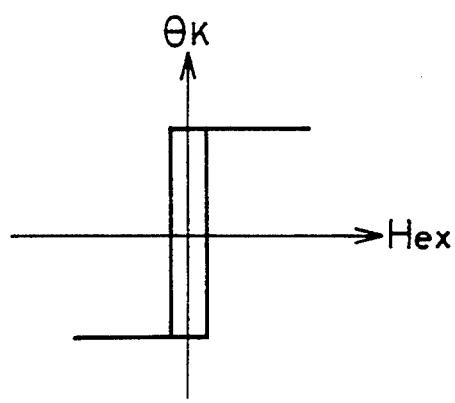
FIG. 7 is an explanatory view showing a relationship between an external magnetic field to be applied onto the readout layer and a polar Kerr rotation angle in a range of $T_1$–$T_2$ of FIG. 5.
Figure 8:
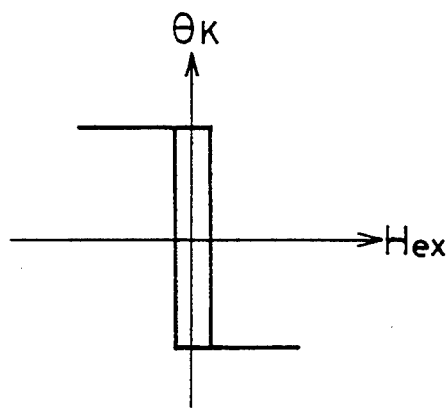
FIG. 8 is an explanatory view showing a relationship between an external magnetic field to be applied onto the readout layer and a polar Kerr rotation angle in a range of $T_2$–$T_3$ of FIG. 5.
Figure 9:
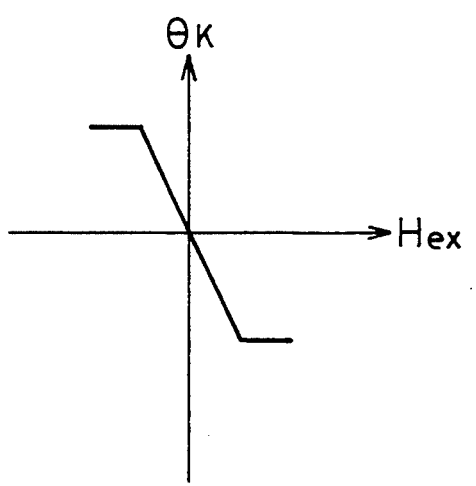
FIG. 9 is an explanatory view showing a relationship between an external magnetic field to be applied onto the readout layer and a polar Kerr rotation angle in a range of $T_3$–Curie temperature $T_C$ of FIG. 5.

FIG. 6 shows hysteresis characteristic of the readout layer 3 in a temperature range of room temperature–$T_1$, the readout layer 3 having the composition shown by P in the magnetic phase diagram of FIG. 5. FIGS. 7 through 9 respectively show hysteresis characteristics in temperature ranges of $T_1$–$T_2$; $T_2$–$T_3$; and $T_3$–Curie temperature $T_C$.

In the temperature range of $T_1$–$T_3$, the readout layer 3 shows such a hysteresis characteristic that an abruptly rising of Kerr rotation angle appears with respect to the external magnetic field. In other temperature ranges, however, the polar Kerr rotation angle is nearly zero.

With the use of the rare-earth transition metal having the above properties in the readout layer 3, a high density recording on the magneto-optical disk can be achieved. Namely, the reproduction of a recording bit with a size smaller than the size of a light beam is enabled as explained below.

In reproducing, the reproduction-use light beam 7 is projected onto the readout layer 3 through the objective lens 105 from the side of the substrate 1 (see FIGS. 2 and 4). In the area irradiated with the light beam 7, the central portion has the greatest temperature rise, and thus the temperature of the central portion becomes higher than the temperature of the peripheral portion. More specifically, since the reproduction-use light beam 7 is converged to a diffraction limit by the objective lens 105, the light intensity distribution shows a Gaussian distribution, and thus the temperature distribution of the portion subjected to reproduction of the magneto-optical disk 201 also like a Gaussian distribution.

In the case where the reproduction-use light beam 7 is set such that the temperature of the central portion of the irradiated area in the readout layer 3 is raised above $T_1$ and the temperature of the peripheral portion is not raised above $T_1$, only the portion having a temperature rise above $T_1$ is subjected to reproduction. Thus, the reproduction of a recording bit with a size smaller than the diameter of the reproduction-use light beam 7 is permitted, thereby achieving a significant improvement in the recording density.

A transition occurs in the portion having a temperature above $T_1$ from in-plane magnetization to perpendicular magnetization. The hysteresis characteristic of the polar Kerr rotation angle changes from the hysteresis characteristic shown in FIG. 6 to the hysteresis characteristic shown in FIG. 7 or FIG. 8. Here, by the exchange coupling force exerted between the readout layer 3 and the recording layer 4, the magnetization of the recording layer 4 is copied to the readout layer 3. On the other hand, since the temperature of the peripheral portion, i.e., outside the area corresponding to the vicinity of the center of the reproduction-use light beam 7 is not raised above $T_1$, the in-plane magnetization is maintained in the peripheral portion (see FIG. 6). As a result, the polar Kerr effect is not shown with respect to the reproduction-use light beam projected perpendicularly onto the film surface.

As described, when a transition occurs from in-plane magnetization to perpendicular magnetization in the area having a temperature rise, the polar Kerr effect is shown only in the area corresponding to the vicinity of the central portion of the reproduction-use light beam 7, and information recorded on the recording layer 4 is reproduced based on the reflected light from the irradiated area.

When the light spot is shifted (in practice, the magneto-optical disk 201 is rotated) so as to reproduce the next recording bit, the temperature of the previous bit drops below $T_1$ and the transition occurs from perpendicular magnetization to in-plane magnetization. Accordingly, the polar Kerr effect is no longer shown in the spot having the temperature drop. Therefore, information is no longer reproduced from the spot having the temperature drop and thus interference by signals from the adjoining bits, which causes noise, is eliminated.

As described, the magneto-optical disk 201 permits a reproduction of a recording bit with a size smaller than the diameter of the light beam 7 without being affected by the adjoining recording bits, thereby achieving a significant improvement in the recording density.

Furthermore, a light interrupting plate 120 is provided in an optical head 201, a diameter of a central portion having a high intensity can be made smaller, thereby permitting a reproduction of a smaller recording bit.

Moreover, since a temperature rise in the readout layer 3 by the side robe is small, the in-plane magnetization is maintained in the portion corresponding to the side robe of the light spot is maintained. Thus, the portion is not subjected to reproduction. An interference by the reproducing signal from the portion is prevented, thereby improving a quality of the reproducing signal.

An example of the magneto-optical disk 201 of the present embodiment is shown below.

The substrate 1 is made of a disk-shaped glass with a diameter of 86 mm, an inner diameter of 15 mm and a thickness of 1.2 mm. Although it is not shown, a guide track for guiding a light beam is formed in a concave-convex shape with a pitch of 1.6 μm, a groove width of 0.8 μm and a land width of 0.8 μm.

On the surface of the substrate 1 whereon the guide track is formed, AlN (Aluminum nitride) with a thickness of 80 nm is formed as a transparent dielectric film 2 (see FIG. 4).

For the readout layer 3, a rare-earth transition metal alloy thin film made of GdFeCo with a thickness of 50 nm is formed on the transparent dielectric film 2. The composition of GdFeCo is $Gd_{0.26}(Fe_{0.82}Co_{0.18})_{0.74}$, and the Curie temperature thereof is at around 300 °C.

For the recording layer 4, rare-earth transition metal alloy thin film made of DyFeCo with a thickness of 50 nm is formed on the readout layer 3. The composition of DyFeCo is $Dy_{0.23}(Fe_{0.78}Co_{0.22})_{0.77}$, and Curie temperature thereof is at around 200 °C.

With the combination of the readout layer 3 and the recording layer 4, the magnetization direction of the readout layer 3 has in-plane magnetization at room temperature (i.e., in the direction of the readout layer 3), and a transition occurs from in-plane magnetization to perpendicular magnetization in a temperature range of 100° C.–125° C.

For the protective film 5, AlN with a thickness of 20 nm is formed on the recording layer 4.

For the overcoat film 6, ultraviolet hardening resin from polyurethane acrylate series with a thickness of 5 μm is formed on the protective film 5.

The manufacturing process of the magneto-optical disk 201 will be explained below.

The guide track on the surface of the glass substrate 1 is formed by reactive ion etching method.

The transparent dielectric film 2, the readout layer 3, the recording layer 4 and the protective film 5 are respectively formed by the sputtering method under vacuum in a common sputtering device. AlN for use in the transparent dielectric film 2 and the protective film 5 was formed in $N_2$ gas atmosphere by the reactive sputtering method in which the sputtering of Al target was carried out. The readout layer 3 and the recording layer 4 were formed by sputtering a composite target whereon Gd tip or Dy tip was arranged on a FeCo alloy target, or ternary alloy target of GdFeCo and DyFeCo using Ar gas.

The overcoat film 6 was formed by applying an ultraviolet hardening resin from polyurethane acrylate series by a spin coating machine, and thereafter, applying ultraviolet ray by an ultraviolet ray projection device so as to harden it.

Next, the results of performance tests conducted using the above magneto-optical disk will be explained.

With the combination of the readout layer 3 and the recording layer 4, the readout layer 3 has in-plane magnetization at room temperature, and a transition occurs from in-plane magnetization to perpendicular magnetization in a temperature range of 100°–125 °C.

Figure 10:
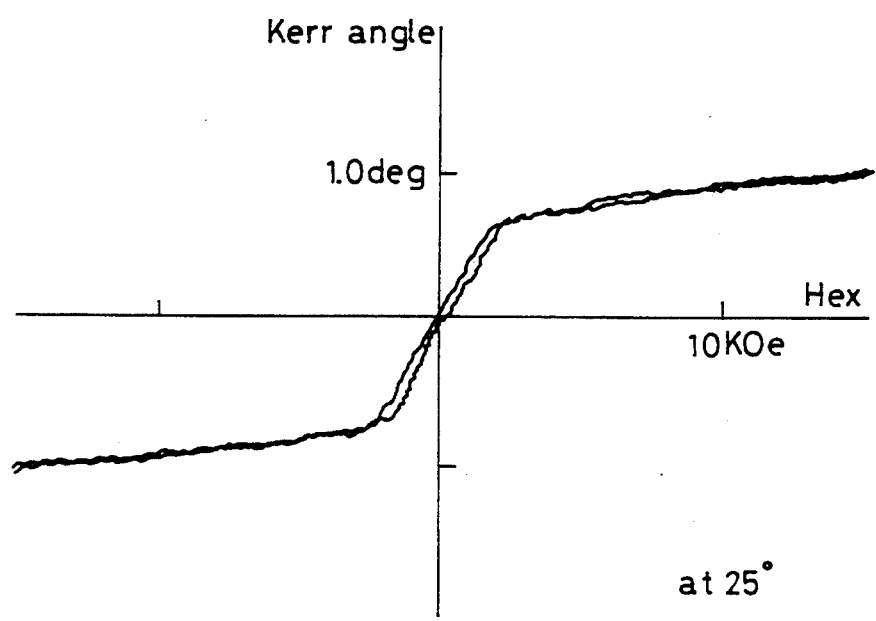
FIG. 10 is a graph which shows results of measurements of external magnetic field dependency at room temperature of the polar Kerr rotation angle of the readout layer in the magneto-optical disk of FIG. 4.
Figure 11:
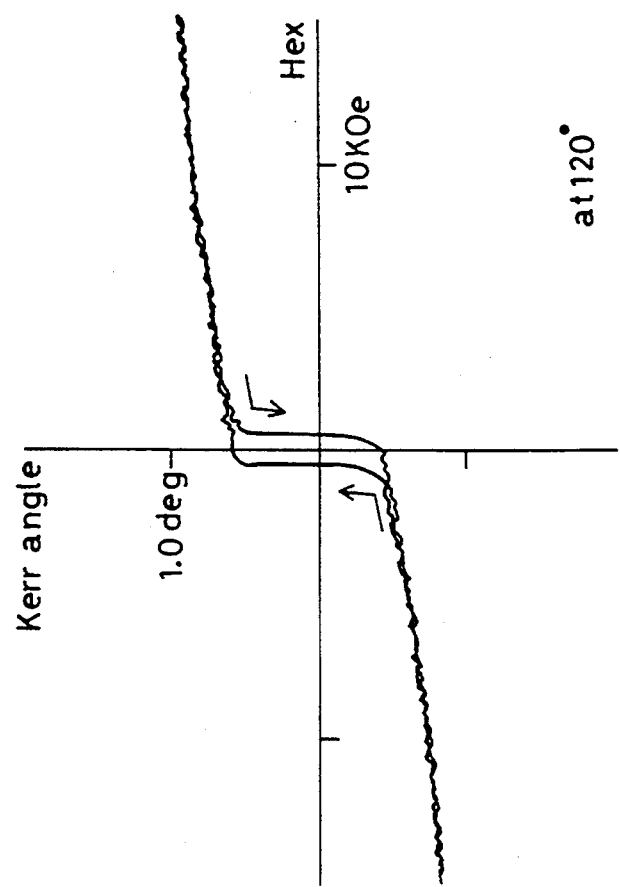
FIG. 11 is a graph which shows results of measurements of external magnetic field dependency at 120° C. of the polar Kerr rotation angle of the readout layer in the magneto-optical disk of FIG. 4.

FIG. 10 and FIG. 11 show respective hysteresis characteristics of polar Kerr rotation angles in the readout layer 3 actually measured at different temperatures. FIG. 10 shows hysteresis characteristic at room temperature (25° C.), and the polar Kerr rotation angle when the external magnetic field (Hex) was not applied was substantially zero. This is because the magnetization perpendicular to the film surface is hardly shown, the magnetization is arranged in a in-plane direction. FIG. 11 shows hysteresis characteristic at 120° C. As can be seen from the graph, the polar Kerr rotation angle of about 0.5 deg is shown, and thus it can be seen that a transition occurs from in-plane magnetization to perpendicular magnetization even when the external magnetization is zero.

For comparison, experimental results of the dynamic measurement in the case where the light interrupting plate 120 is taken out of the optical head 202 will be explained first. Here, the semiconductor laser 101 used in the measurements has a wavelength of 780 nm, and the number of aperture (N.A.) of the objective lens 105 is 0.55.

A recording bit of a uniform frequency with a length of 0.765 μm was recorded on the land at 26.5 mm radial position of the magneto-optical disk 201 rotating at 1800 rpm (linear velocity of 5 m/sec). In recording, first, the magnetization direction of the recording layer 4 was arranged in one direction (erased state). Thereafter, the direction of the recording use external magnetic field was fixed in one direction opposite to the direction of the erased state. Then, a laser beam was modulated at a recording frequency (substantially 3.3 MHz) corresponding to a length of 0.765 μm. The recording laser power was set around 8 mW.

Figure 12:
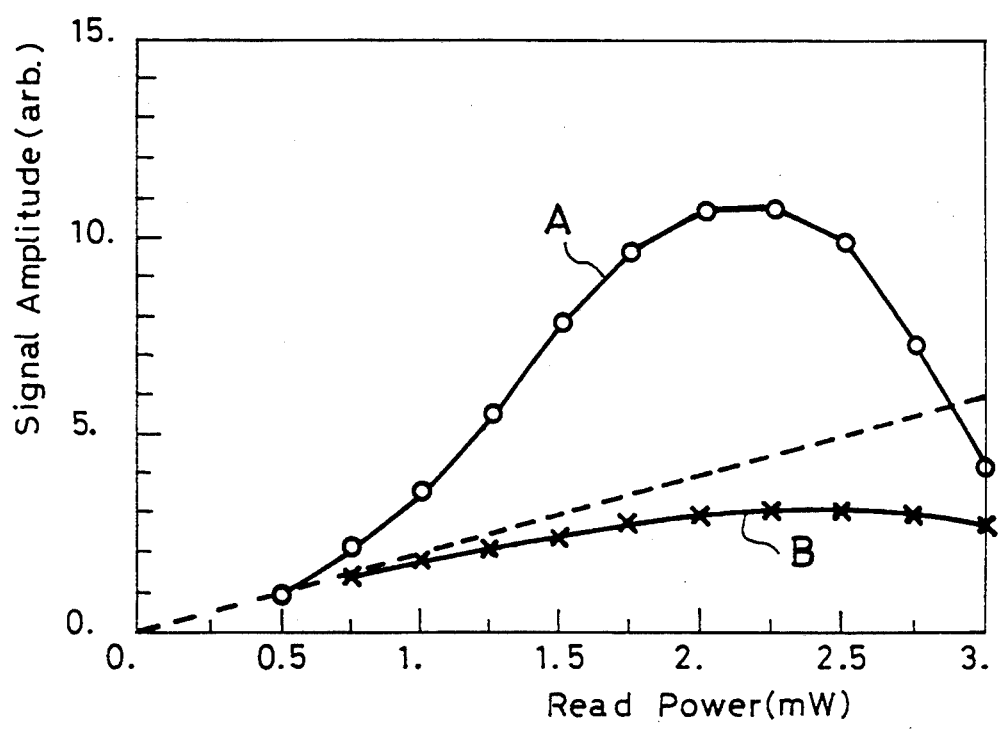
FIG. 12 is a graph showing an amplitude of a reproducing signal from the magneto-optical disk of FIG. 4 with respect to a reproducing laser power.

The recorded bit strings were reproduced by applying reproduction-use laser beams with different reproducing laser power. The measured amplitudes of the reproducing signal waveform is shown in FIG. 12. In the figure, x-axis indicates the reproducing laser power, and the measured reproducing laser power was in a range of 0.5–3 mW. Y-axis indicates the amplitude of the reproducing signal, and the measured amplitudes were normalized at the reproducing laser power of 0.5 mW.

In the figure, the curved line A shows the results of measurement using the magneto-optical disk 201 of the present invention, and the curved line B shows the results of measurement using the conventional magneto-optical disk as a comparative example.

The conventional magneto-optical disk is composed of the glass substrate 1, which is the same as the above-mentioned substrate 1, whereon AlN with a thickness of 80 nm, DyFeCo with a thickness of 20 nm, AlN with a thickness of 25 nm and AlNi with a thickness of 30 nm are laminated in this order. Further, the overcoat film which is the same as the above-mentioned overcoat film is formed on AlNi.

In this arrangement of the conventional magneto-optical disk, only a single magnetic layer made of DyFeCo which is rare-earth transition metal alloy is provided so as to be sandwiched between two transparent dielectric films made of AlN. Then, a reflective film made of AlNi is formed on the top. This configuration is called "reflective film structure", and has been already on the market as represented by 3.5 inch size single plate magneto-optical disk. As well known, the recording layer made of DyFeCo of the conventional magneto-optical disk has perpendicular magnetization at above from room temperature.

In FIG. 12, the dotted linear line connects 0 point (origin) and the amplitude value at a laser power of 0.5 mW, which shows relationship between the amplitude of the reproducing signal of the magneto-optical signal and the reproducing laser power.

reproducing signal amplitude ∞ recording medium
reflective light amount × polar Kerr rotation angle In the above formula, the recording medium reflective light amount increases in proportion to the reproducing laser power and thus it can be replaced with the reproducing laser power.

The curve B which shows the measured values using the conventional magneto-optical disk is located at lower position than the above linear line for the following reasons: as the reproducing laser power increases, reflective light amount from the recording medium increases; on the other hand, the temperature of the recording medium is raised. The magnetization of the magnetic substance in general has such a characteristic that it reduces as the temperature rises, and the magnetization disappears at Curie temperature. Therefore, in the conventional magneto-optical disk, since the polar Kerr rotation angle becomes smaller as the temperature rises, the curve is not on the linear line but below the linear line in the graph.

On the other hand, the curve A which shows the results of measurements of the magneto-optical disk 201 of the present invention shows an abrupt increase in the signal amplitude as the reproducing laser power increases, and it is maximized at around 2–2.25 mW. Other than at a laser power of 3 mW, the curve A is located above the linear line. As can be seen, the amplitude increases in a higher proportion than the reproducing laser power. The result shows that at low temperature, the polar Kerr rotation angle hardly appears, and as temperature raises, a transition suddenly occurs from in-plane magnetization to perpendicular magnetization, which is reflected by the property of the readout layer 3 and gives substance of the performance of the readout layer 3.

The described measurements were carried out from the land. However, when the same measurements were carried out from the groove, the same results were obtained.

Next, the results of measurement of the reproducing signal quality with respect to the smaller recording bit will be explained.

Figure 13:
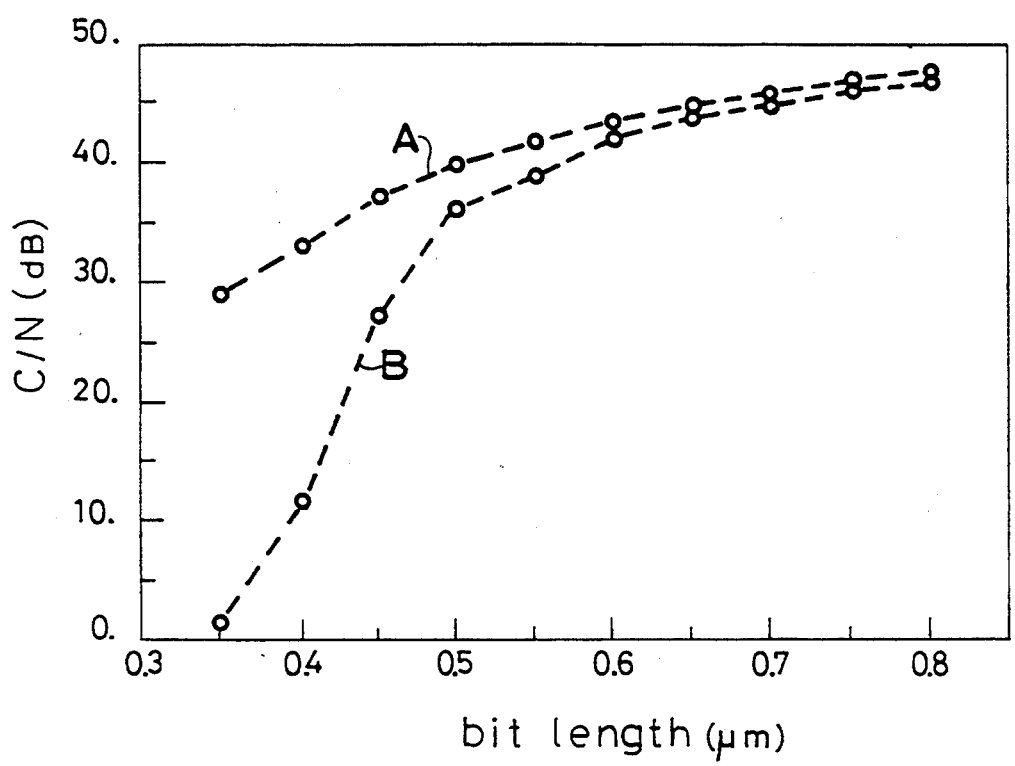
FIG. 13 is a graph showing a reproducing signal quality (C/N) of the magneto-optical disk of FIG. 4 with respect to a recording bit length.

FIG. 13 shows the results of measurements of the reproducing signal quality (C/N) with respect to the recording bit length. In this measurement, the linear velocity of the magneto-optical disk 201 was set at 5 m/sec as in the previous experiment. Under the above condition, a recording was carried out at different frequencies, and respective values for the C/N were measured. In this experiment, the same optical pickup and the recording method as the previous experiment were used.

In the figure, the curve A shows the results of measurements using the magneto-optical disk 201 of the present invention, and a reproducing laser power was set at 2.25 mW. The curve B shows the results of measurements using the conventional magneto-optical disk with a reproducing laser power of 1 mW as in the case of the previous experiment.

As to the long recording bit with a length of not less than 0.6 μm, the differences in C/N between the two disks were not significant. However, as to the recording bit with a length not more than 0.6 μm, a sudden decrease in C/N was observed from the conventional magneto-optical disk. This is because as the recording bit becomes shorter, the number of recording bits (area) increases within the irradiated area of the light beam, and finally, the recording bits cannot be identified one from another.

A cut-off space frequency is one of the index representative of the optical resolving power of the optical pickup. The cut-off space frequency is determined by the wavelength of the semiconductor laser 101 and the N.A. of the objective lens 105. Using the optical head of the present embodiment, with the wavelength of the semiconductor laser 101 (780 nm) and the N.A. of the objective lens 105 (0.55), the cut-off frequency was calculated, and was converted into the recording bit length by the following equation:

$$780 \text{ nm}/(2* 0.55)/2 = 0.355 \text{ μm}$$

Namely, the limit of the optical resolving power of the optical pickup used in this experiment is the recording bit length of 0.355 μm. Reflecting the above property, the obtained C/N from the conventional magneto-optical disk was substantially zero in the case of a recording bit with a length of 0.35 μm.

On the other hand, in the magneto-optical disk 201 of the present invention, as the recording bit becomes shorter, C/N decreases. However, even with optical resolving power below 0.355 μm, C/N of nearly 30 dB Has obtained.

From the above experimental results, it is proved that with the use of the magneto-optical disk 201 of the present invention, the reproduction of a recording bit with a size smaller than the optical analyzing limit is enabled, thereby achieving a significant improvement in a recording bit density compared with the conventional magneto-optical disk.

In addition to the above effects of the present invention confirmed by the above experiments, the following description will discuss crosstalk as another important index.

In magneto-optical disks, generally, in the case where recording and reproducing are carried out on and from the lands, the guide track is formed such that the land width is made as wide as possible, and the groove is made narrower so as to record and reproduce only on and from the land. In this type of the magneto-optical disk, crosstalk means interference from the recording bits recorded on the adjoining lands when reproducing from the lands. On the other hand, in the magneto-optical disks wherein recording and reproducing operations were carried out from the grooves, crosstalk means interference from the recording bits recorded on the adjoining grooves formed on the magneto-optical disk.

For example, according to the IS10089 standard (set with regard to ISO 5.25 rewritable optical disk), in the guide track with a pitch of 1.6 μm, the crosstalk with respect to the shortest recording bit (0.765 μm) must not exceed −26 dB.

In the present embodiment, by the crosstalk measuring method set in the normalization of IS10089 standard, the crosstalk was measured with respect to a recording bit with a length of 0.765 μm. In order to confirm the effect of the magneto-optical disk 201 of the present invention composed of the described glass substrate 1 with a track pitch of 1.6 μm, a land width of 0.8 μm and a groove width of 0.8 μm, the crosstalk from adjoining grooves when reproducing from a land and the crosstalk from adjoining lands when reproducing from the groove were measured.

Figure 14:
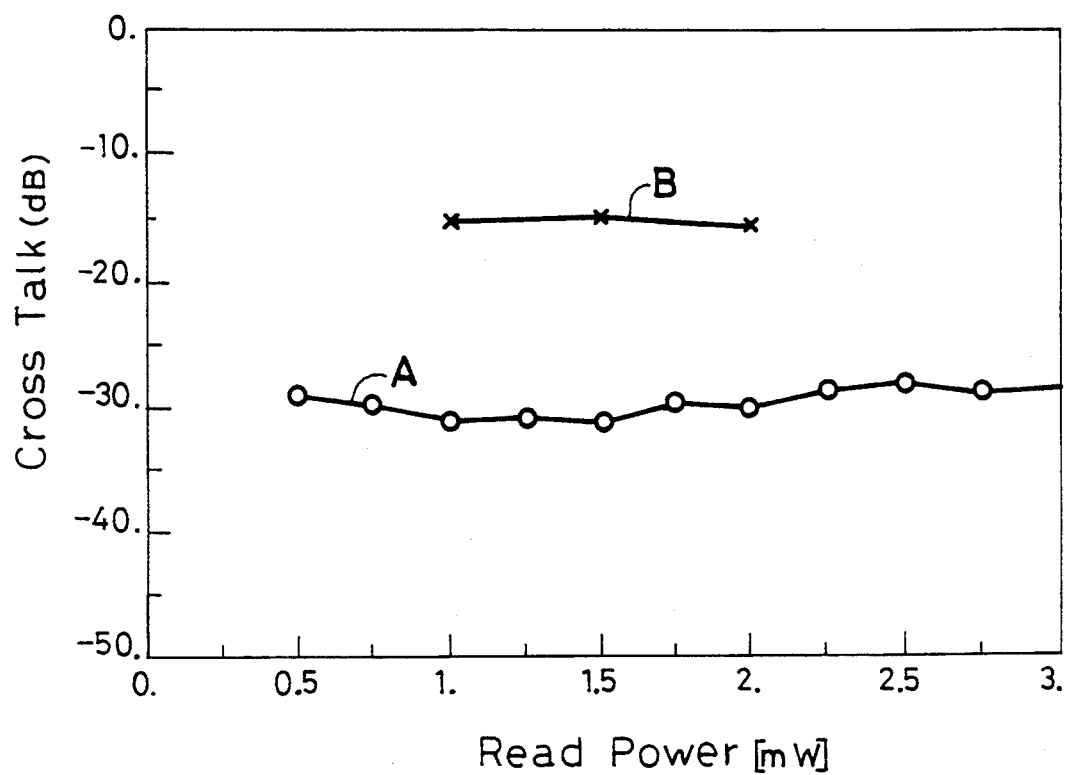
FIG. 14 is a graph in which crosstalk from the magneto-optical disk of FIG. 4 is plotted with respect to a reproducing laser power.

FIG. 14 shows the results of measurements when reproducing from the land. In the figure, x-axis indicates the reproducing laser power, and y-axis indicates crosstalk. In the figure, the curve A shows the results of measurements using the magneto-optical disk 201 of the present invention, and the curve B shows the result of measurements using the conventional magneto-optical disk.

The conventional magneto-optical disk (B) shows a large crosstalk of −15 dB. On the other hand, the magneto-optical disk (A) of the present invention shows the crosstalk of −30 dB which is below −26 dB which satisfies the ISO standard.

The same experimental results were obtained as to the crosstalk in reproducing from the groove.

Figure 15:
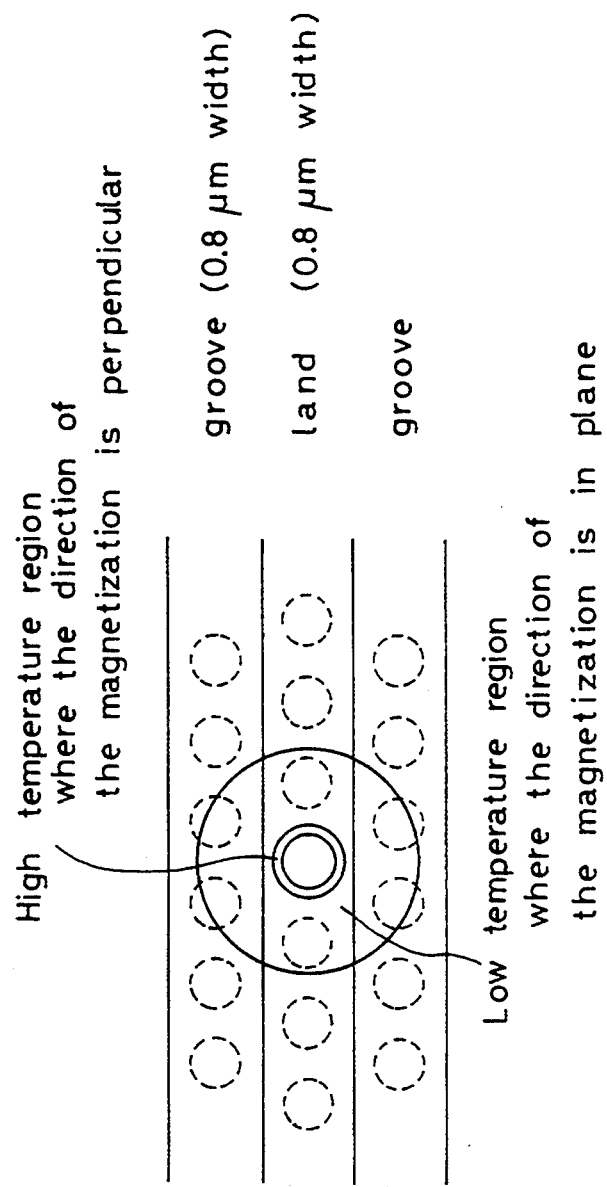
FIG. 15 is an explanatory view which shows effects of the magneto-optical disk of FIG. 4.

The technical reasons why such results were obtained will explained in reference to FIG. 15.

FIG. 15 is a schematic plan view from above the magneto-optical disk 201. On the magneto-optical disk, recording bits are recorded on the land (at the center) and the adjoining grooves (as shown by dotted circles). The large solid circle in the figure indicates a light spot formed as the reproduction-use light beam 7 is converged on the disk. Here, the servo was set so that the light spot follows the land. In the figure, both the land width and the groove width are set at 0.8 μm, and the diameter of the light spot (light beam diameter) is set at 1.73 μm (=Airy disk diameter=1.22*780 nm /0.55). For convenience, the recording bit diameter is shown by the size of 0.335 μm.

In the figure, seven recording bits are included in the reproduction-use light beam 7. In the conventional magneto-optical disk, each recording bit has perpendicular magnetization (for example, the magnetization direction of the recording bit is upward in a perpendicular direction, and the magnetization direction in other areas (erased areas) is downward in a perpendicular direction) and respectively show the polar Kerr effect, the signals in the light beam cannot be separated from one another. For this reason, in the case of the conventional magneto-optical disk, the C/N was small (at 0.35 μm bit length), and the crosstalk from the adjoining tracks was large in the above-mentioned experiment.

On the other hand, in the magneto-optical disk 201 of the present invention, the readout layer 3 has perpendicular magnetization in the vicinity of the center of the reproduction-use light beam 7, as the temperature thereof being higher than the peripheral portion, and in other areas, in-plane magnetization remains. Therefore, among seven recorded bits in the light spot of the reproduction-use light beam 7, only the recorded bit at the center is subjected to reproduction. Thus, C/N of substantially 30 dB can be obtained even when reproducing a small recording bit with a size of 0.335 μm. Moreover, the crosstalk from the adjoining tracks can be made significantly smaller.

From the above experimental results, it can be proved that with the use of the magneto-optical disk 201 of the present embodiment, a more than two times as high recording density as the conventional magneto-optical disk can be achieved.

Experimental results of dynamic measurements using an optical head 202 provided with the light interrupting plate 120 of the present embodiment will be explained.

As mentioned earlier, w/R, i.e., a ratio of a width (w) of the light interrupting plate 120 to a light beam diameter (R) is 0.2. The semiconductor laser 101 has a wavelength of 780 nm, and the number of aperture (NA) of the objective lens 105 is 0.55.

First, without the light interrupting plate 120, a recording bit having a uniform period of 0.765 μm is recorded beforehand on a land at 26.5 mm from the center of the magneto-optical disk 201 at 1800 rpm (linear velocity of 5 m/sec).

Next, with the light interrupting plate 120, the recording bit string is reproduced. As a result, the obtained C/N value is the same as that obtained without the light interrupting plate 120. Namely, the experimental results proved that interference by reproducing signals due to the side robes did not occur.

The same recording and reproducing operations were carried out using the conventional magneto-optical disk. The obtained C/N value was less than that obtained without the light interrupting plate 120 by more than 8 dB. Namely, the experimental results shows that interference by reproducing signals due to the side robes occur. Moreover, the amplitude of the reproducing signal is less than a half of that obtained without the light interrupting plate 120.

Thus, in the case where the optical head 202 provided with the light interrupting plate 120 is used, the magneto-optical disk 201 is preferably used.

Recording and reproducing operations were carried out with the use of the optical head 202 provided with the light interrupting plate 120 under the same conditions as the previous experiments. In the experiment, when the w/R of the light interrupting plate 120 is changed from 0.2 to 0.3, the C/N was significantly reduced.

When the width (w) of the light interrupting plate 120 is made wider, the extension of the main robe becomes small, and the intensity of the side robe increases. Therefore, in the case of using the light interrupting plate 120 having w/R=0.2, the recording was not performed with respect to the side robe. On the other hand, in the case of using the light interrupting plate 120 having w/R=0.3, the recording was performed with respect to the side robe.

From the results of the above experiment, the width (w) of the light interrupting plate 120 is preferably set lower than 0.3×R, more preferably set around 0.2×R.

Next, recording and reproducing operations were carried out using the optical head 202 provided with the light interrupting plate 120 having w/R=0.2 under the same condition as the above experiments measured without the light interrupting plate 120, and C/N values were measured. The C/N obtained with respect to the recording bit with a length of 0.35 μm using the optical head 202 was improved by more than 5 dB compared with that obtained using the previously described optical head which does not include the light interrupting plate 120. This is because, with the light interrupting plate 120, a diameter of the central portion of the light beam can be made smaller.

Next, recording and reproducing operations were carried out using the optical head provided with the light interrupting plate 120 with w/R=0.2 under the same condition as the above experiments measured without the light interrupting plate 120, and crosstalk was measured. The obtained Crosstalk was −30 dB which is substantially the same as-that obtained using the optical head without the light interrupting plate 120.

As described, with the combination of the optical head 202 provided with the light interrupting plate 120 and the magneto-optical disk 201, the diameter of the central portion of the light spot can be made smaller. Moreover, the reproducing signal from both sides of the central portion can be reduced, thereby permitting reproduction of information recorded at high density.

The composition of GdFeCo of the readout layer 3 is not limited to $Gd_{0.26}(Fe_{0.82}Co_{0.18})_{0.74}$ as long as the readout layer 3 has in-plane magnetization at room temperature and a transition occurs therein from in-plane magnetization to perpendicular magnetization at above room temperature. As to the rare-earth transition metal alloy, by varying the ratio of the rare-earth to the transition metal, the compensation temperature at which the magnetic moment of the rare-earth and the magnetic moment of the transition metal balance with one another can be adjusted. Since GdFeCo is a material series which has perpendicular magnetization in the vicinity of a compensation temperature, temperature at which a transition occurs from in-plane magnetization to perpendicular magnetization can be adjusted by changing the compensation temperature by adjusting the ratio of Gd to FeCo.

Figure 16:
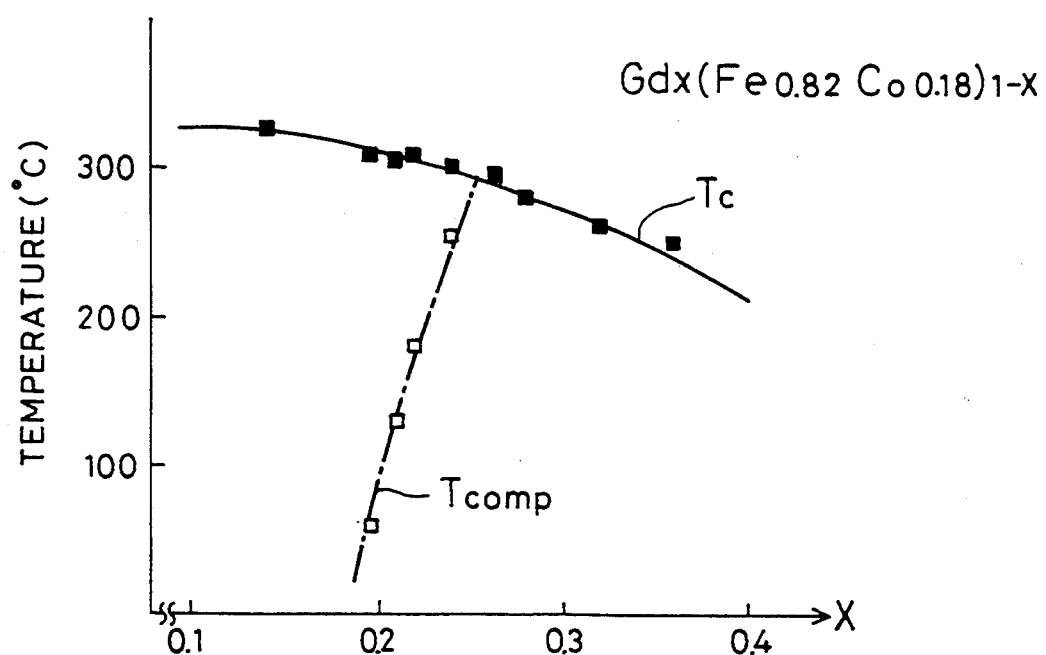
FIG. 16 is a graph which shows composition dependencies of Curie temperature ($T_C$) and compensation temperature ($T_{comp}$) of $Gd_X(Fe_{0.82}Co_{0.18})_{1-X}$.

FIG. 16 shows experimental results of compensation temperature and Curie temperature with a variable X in $Gd_X(Fe_{0.82}Co_{0.18})_{1-X}$, i.e., when the composition of Gd was varied.

As is clear from the figure, in the compensating composition range where the compensation temperature above room temperature (25° C.), X is set equal to or above 0.18, and it is preferably set so as to satisfy the inequality: $0.19 < X < 0.29$. This is because when X is set in this range, in the configuration where the readout layer 3 and the recording layer 4 are laminated, temperature at which a transition occurs from in-plane magnetization to perpendicular magnetization can be set in a range of room temperature–200° C. If the above temperature becomes too high, there arises the possibility that the reproduction-use laser power becomes as high as the recording-use laser power, and thus the information recorded on the recording layer 4 may be disturbed.

The following will explain a change in the properties (compensation temperature and Curie temperature) in the case where the ratio of Fe to Co is varied in the GdFeCo series, i.e., Y is varied in $Gd_X(Fe_{1-Y}Co_Y)_{1-X}$.

Figure 17:
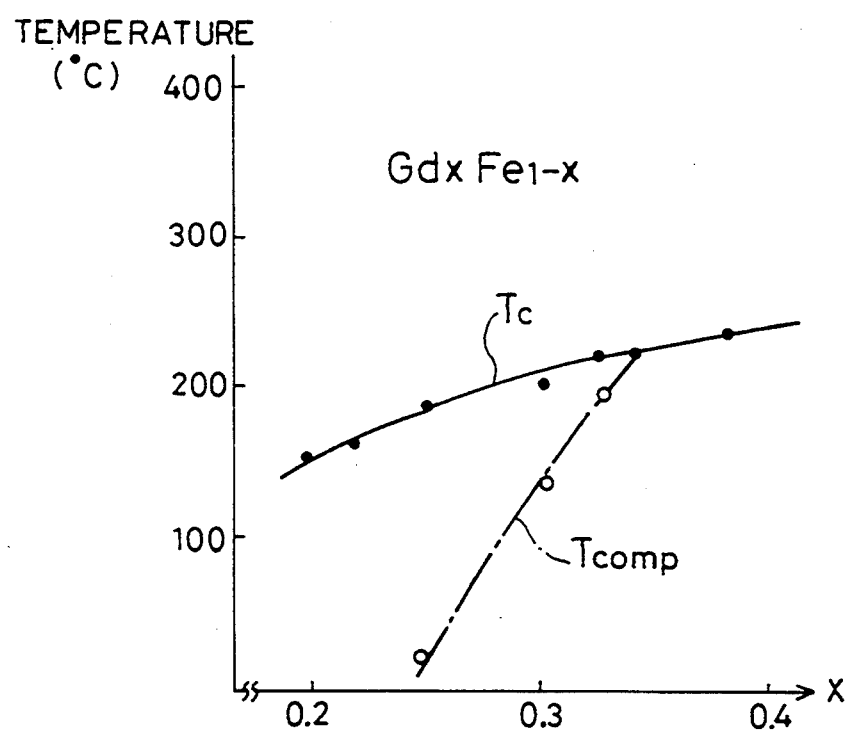
FIG. 17 is a graph which shows composition dependencies of Curie temperature ($T_C$) and compensation temperature ($T_{comp}$) of $Gd_XFe_{1-X}$.

FIG. 17 shows the property of $Gd_X(Fe_{1-Y}Co_Y)_{1-X}$ when Y=0, i.e., the property of $Gd_XFe_{1-X}$. For example, when X=0.3 in the composition of Gd, the compensation temperature is substantially at around 120° C. and the Curie temperature is at around 200° C.

Figure 18:
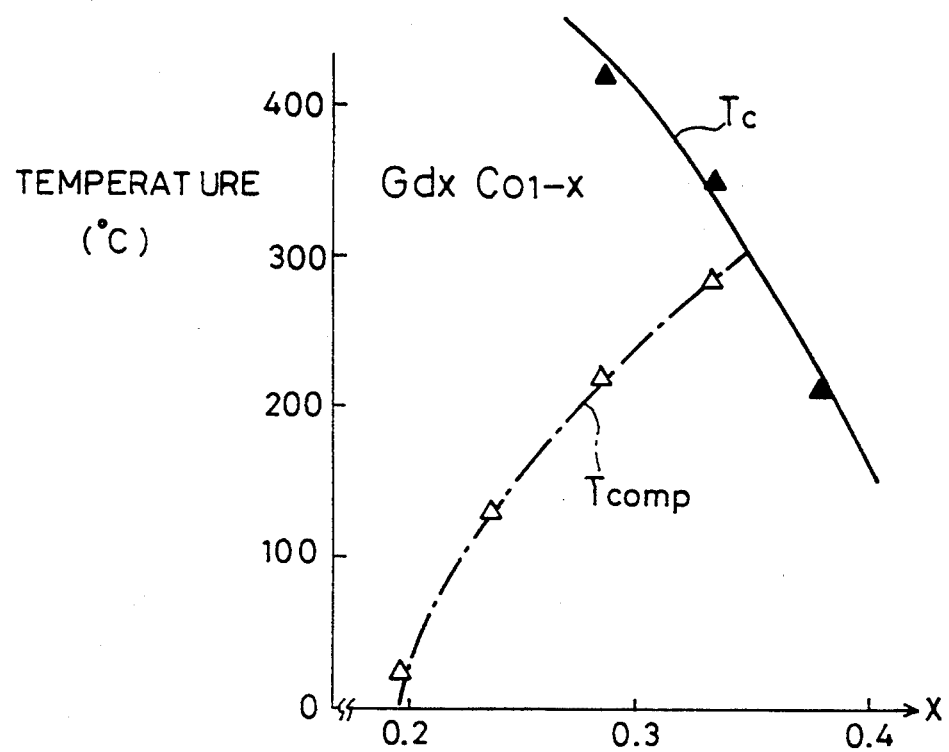
FIG. 18 is a graph which shows composition dependencies of Curie temperature ($T_C$) and compensation temperature ($T_{comp}$) of $Gd_XCo_{1-X}$.

FIG. 18 shows the property of $Gd_X(Fe_{1-Y}Co_Y)_{1-X}$ when Y=1, i.e., the property of $Gd_XCo_{1-X}$. For example, when X=0.3 in the composition of Gd, the compensation temperature is at around 220° C. and the Curie temperature is at around 400° C.

As can be seen, with the same composition of Gd, as the content of Co increases, the compensation temperature and Curie temperature go up.

The polar Kerr rotation angle in reproducing should be set as high as possible in order to obtain the higher C/N. Thus, the Curie temperature of the readout layer 3 is preferably set as high as possible. However, it should be noted here that if too much Co is contained, temperature at which transition occurs from in-plane magnetization to perpendicular magnetization also becomes higher.

In considering the above, Y in $Gd_X(Fe_{1-Y}Co_Y)_{1-X}$ is preferably set so as to satisfy the following inequality:

$$0.1 < Y < 0.5.$$

Needless to say, the properties of the readout layer 3, such as temperature at which a transition occurs from in-plane magnetization to perpendicular magnetization are affected by the composition of the material used in the recording layer 4 and the film thickness of the recording layer 4. This is because exchange coupling force is exerted magnetically between the readout layer 3 and the recording layer 4.

Therefore, appropriate composition of the material used in the readout layer 3 and the film thickness of the readout layer 3 differ depending on the material used in the recording layer 4 and the composition of the material and the film thickness of the recording layer 4.

As a material for the readout layer 3 of the magneto-optical disk of the present invention, GdFeCo is used wherein abrupt transition occurs from in-plane magnetization to perpendicular magnetization. However, even when other rare-earth transition metal alloys (to be described later) were used, the same effect could be obtained.

The $Gd_XFe_{1-X}$ has properties shown in FIG. 17, and when X satisfies the inequality: $0.24 < X < 0.35$, it has a compensation temperature above room temperature.

The $Gd_XCo_{1-X}$ has properties shown in FIG. 18, and when X satisfies the inequality: $0.20 < X < 0.35$, it has a compensation temperature above room temperature.

When FeCo alloy is used as a transition metal, $Tb_X(Fe_YCo_{1-Y})_{1-X}$ has its compensation temperature above room temperature when X satisfies the inequality: $0.20 < X < 0.30$ (Y is selected at random). $Dy_X(Fe_YCo_{1-Y})_{1-X}$ has its compensation temperature above room temperature when X satisfies the inequality: $0.24 < X < 0.33$ (Y is selected at random). $Ho_X(Fe_YCo_{1-Y})_{1-X}$ has its compensation temperature above room temperature when X satisfies $0.25 < X < 0.45$ (Y is selected at random).

Alternatively, a material which has the following properties is suitable as well for the readout layer 3: when the wavelength of the semiconductor laser as a light source of the optical head 202 becomes less than 780 nm described, the polar Kerr rotation angle at the wavelength is large.

As explained earlier, in the optical disk such as the magneto-optical disk 201, the recording density is limited by the size of the light beam, which is determined by the laser wavelength and the aperture of the objective lens 105. Therefore, only by making the wavelength of the semiconductor laser shorter, the recording density on the magneto-optical disk can be improved. At present, the semiconductor laser 101 with a wavelength of 670 nm–680 nm is in practical use, and SHG laser with a wavelength equal to or below 400 nm has been earnestly studied.

The Kerr rotation angle of the rare-earth transition metal alloy has a wavelength dependency. Generally, as the wavelength becomes shorter, the Kerr rotation angle becomes smaller. However, with the use of the film which has large Kerr rotation angle with short wavelength, the intensity of the signal increases, thereby obtaining a high quality reproducing signal.

In the above material for the readout layer 3, by slightly adding at least one element selected from the group consisting of Nd, Pt, Pr and Pd, the greater Kerr rotation angle can be achieved with the properties required for the readout layer 3 substantially remains the same. As a result, the magneto-optical disk which permits a high quality reproducing signal even when the semiconductor laser with a short wavelength can be achieved.

Furthermore, by adding a small amount of at least one element selected from the group consisting of Cr, V, Nb, Mn, Be and Ni, the resistance to environment of the readout layer 3 can be improved. Namely, the readout layer 3 can be prevented the deterioration of the property due to the oxidation of the material by the moisture and oxygen being entered, thereby ensuring a reliable performance of the magneto-optical disk 201 for a long period of time.

In the present embodiment, the thickness of the readout layer 3 is set at 50 nm. However, the thickness of the readout layer 3 is not limited to the above thickness. As shown in FIG. 4, the recording and reproducing of information are carried out from the side of the readout layer 3. If the readout layer 3 is too thin, the information recorded on the recording layer 4 may reach the readout layer 3. Namely, the mask effect by the in-plane magnetization of the readout layer 3 becomes weaker.

As explained earlier, since the magnetic property of the readout layer 3 is affected by the recording layer 4, a suitable thickness for the readout layer 3 changes depending on the material used in each layer and the composition thereof. However, for the readout layer 3, the thickness of at least 20 nm is required, and preferably, the thickness thereof is set above 50 nm. On the other hand, if the readout layer 3 becomes too thick, the information recorded on the recording layer 4 may not be copied the readout layer 3. Therefore, the film thickness of the readout layer 3 is preferably set below 100 nm.

As to the material for the recording layer 4, a material which has perpendicular magnetization in a temperature range of room temperature–Curie temperature and which has a Curie temperature suitable for recording (at around 150°–250° C.) may be used.

In the present embodiment, DyFeCo is used for the recording layer 4. DyFeCo is a material having a small perpendicular magnetic anisotoropy, and thus by adapting DyFeCo, a recording operation can be carried out even with a small external magnetic field. This is an advantageous characteristic especially for the overwrite recording method by the magnetic field modulation (to be described later), and a compact size of the recording-use magnetic field generation device, and the reduction in the electric power consumption are enabled.

Other suitable materials for the recording layer 4 are TbFeCo, GdTbFe, NdDyFeCo, GdDyFeCo and GdTbFeCo.

Additionally, by adding at least one element selected from the group consisting of Cr, V, Nb, Mn, Be and Ni, to the material used in the recording layer 4, a reliable performance of the recording layer 4 can be ensured for a longer period of time. The suitable thickness of the recording layer 4 is determined by the material, the composition of the material used in the readout layer 3 and the thickness of the readout layer 3, and it is preferably set in a range of 20 nm–100 nm.

The thickness of AlN (transparent dielectric film 2) is not limited to 80 nm.

The thickness of the transparent dielectric film 2 is determined in considering a so-called Kerr effect enhancement which increases a polar Kerr rotation angle from the readout layer 3 utilizing the interference effect of light in reproducing from the magneto-optical disk. In order to make the signal quality (C/N) in reproducing as high as possible, the Kerr rotation angle is set as large as possible.

The film thickness changes depending on the wavelength of the reproducing light and the refractive index of the transparent dielectric film 2. In the present embodiment, AlN is used as a material for the transparent dielectric film 2, which has the refractive index of 2.0 with respective to the reproducing light with a wavelength of 780 μm. Thus, with the use of AlN with a thickness of 30–120 nm for the transparent dielectric film 2, a large Kerr effect enhancement can be achieved. More preferably, AlN with a thickness of 70–100 nm is used for the transparent dielectric film 2 because the Kerr rotation angle is almost maximized in the above range of the film thickness.

The above explanation has been given through the case of a reproducing light with a wavelength of 780 nm. However, the wavelength of the reproducing light is not limited to this. For example, when a reproducing light with a wavelength of 400 nm which is substantially ½ of the above wavelength of 780 nm, the thickness of the transparent dielectric film 2 is preferably set ½ of the film thickness when the reproducing light with the wavelength of 780 nm is used.

Additionally, the refractive index of the transparent dielectric film 2 may be changed depending on a material used in the transparent dielectric film 2 or the method used in manufacturing the transparent dielectric film 2. In such a case, the thickness of the transparent dielectric film 2 is adjusted so as to set the refractive index × the film thickness (=optical path length) constant.

In the case of the present embodiment, 2 (the refractive index of AlN used in the transparent dielectric film 2)×80 nm (film thickness of the transparent dielectric film)=160 nm (optical path length). However, for example, when the refractive index of AlN is changed from 2 to 2.5, the film thickness is preferably set at 160 nm/2.5=64 nm.

As can be seen from the above explanation, by making the refractive index of the transparent dielectric film 2 greater, the film thickness of the transparent dielectric film 2 can be made thinner, and the greater enhance effect of the polar Kerr rotation angle can be achieved.

The refractive index of AlN can be changed by changing the ratio of Ar to $N_2$ (sputtering gas used in sputtering), the gas pressure, etc. In general, AlN has relatively large refractive index of approximately 1.8–2.1, and thus it is a suitable material for the transparent dielectric film 2.

Not only for the enhancement of the Kerr effect, the transparent dielectric film 2 also prevents the oxidization of the readout layer 3 and the recording layer 4 which are magnetic layers made of rare-earth transition metal alloy as the protective film 5 does.

The magnetic layer made of rare-earth transition metal is likely to be oxidized, and especially, rare-earth metal is very likely to be oxidized. Therefore, entering of oxygen and moisture from outside must be prevented in order to prevent the deterioration of the properties of the layers.

Therefore, in the present embodiment, the readout layer 3 and the recording layer 4 are sandwiched by the AlN films. Since the AlN film is a nitride film which does not include oxygen, its moisture resistance is high.

Furthermore, AlN which has a large refractive index (in the vicinity of 2) is transparent. Thus, with the use of AlN, a reliable performance of the magneto-optical disk can be ensured for a long period of time.

Additionally, using Al target, a reactive DC (direct current) sputtering may be carried out by introducing $N_2$ gas or mixed gas of Ar and $N_2$. In this sputtering method, a faster film forming speed can be achieved compared with the RF (radio frequency) sputtering method.

Other than AlN, the following materials which have large refractive index are suitable for the transparent dielectric film 2: SiN, AlSiN, AlTaN, SiAlON, TiN, TiON, BN, ZnS, $TiO_2$, $BaTiO_3$ and $SrTiO_3$. Especially, since SiN, AlSiN, AlTiN, TiN, BN and ZnS do not include oxygen, the magneto-optical disk which has an excellent moisture resistance be provided.

In the present embodiment, the AlN used in the protective film 5 is set at 20 nm thick. However, the film thickness of the protective film 5 is not limited to this, and it is preferably set in a range of 1–200 nm.

In the present embodiment, the film thickness of the readout layer 3 and the recording layer 4 being laminated is set at 100 nm thick. With this thickness, a light which is incident thereon from the optical pickup 202 is hardly transmitted through the magnetic layers. Therefore, there is not limit for the film thickness of the protective film 5 as long as the oxidization of the magnetic films can be prevented for a long period of time. Therefore, when the material which has low oxidization resistance is used, the film thickness should be made thick; on the other hand, when the material which has high oxidization resistance is used, the film thickness should be made this.

The thermal conductivity of the protective film 5 as well as the transparent dielectric film 2 affects the recording sensitivity of the magneto-optical disk 201. Specifically, the recording sensitivity represents the laser power required for recording or erasing. The light incident on the magneto-optical disk 201 is mainly transmitted through the transparent dielectric film 2. Then, it is absorbed by the readout layer 3 and the recording layer 4 which are absorbing films, and changes into heat. Here, heat generated from the readout layer 3 and the recording layer 4 moves onto the transparent dielectric film 2 and the protective film 5 by the conduction of heat. Therefore, the respective thermal conductivities and the thermal capacities (specific heat) of the transparent dielectric film 2 and the protective film 5 affect the recording sensitivity.

This means that the recording sensitivity of the magneto-optical disk 201 can be controlled to some extent by the thickness of the protective film 5. For example, by making the film thickness of the protective film 5 thinner, the recording sensitivity can be increased (a recording or erasing operation can be carried out with low laser power). Normally, in order to extend the life of the laser, it is preferable to have relatively high recording sensitivity, and thus the thinner protective film 5 is preferable.

In this sense also, AlN is a suitable material. Because of its excellent moisture resistance, by adapting it to the protective film 5, the magneto-optical disk 201 which ensures a high recording sensitivity can be achieved.

In the present embodiment, AlN is used both in the protective film 5 and the transparent dielectric film 2. Therefore, the magneto-optical disk of the present invention has an excellent moisture resistance. Moreover, since the same material is used for the transparent dielectric film 2 and the protective film 5, the productivity of the magneto-optical disk 201 can be improved. As described, AlN has an excellent moisture resistance, and thus the AlN film can be set relatively thin (20 nm). The thinner film is preferable in a term of productivity as well.

In considering the above objective and effect, other than AlN, the following materials which can be used also as materials for the transparent dielectric film 2 are suitable for the protective film 5: SiN, AlSiN, AlTaN, SiAlON, TiN, TiON, BN, ZnS, $TiO_2$, $BaTiO_3$ and $SrTiO_3$.

Additionally, by the use of a common material for the protective film 5 and the transparent dielectric film 2, the productivity can be improved.

Especially, when SiN, AlSiN, AlTaN, TiN, BN or ZnS which does not include oxygen is used, a magneto-optical disk which has an excellent moisture resistance can be achieved.

Other than glass, chemically tempered glass may be used as a substrate 1. Alternatively, a 2 P layered glass substrate 1 in which ultraviolet ray hardening resin film is formed on the glass or chemically tempered glass substrate, polycarbonate (PC), polymethyl methacrylate (PMMA), amorphous polyolefin (APO), polystyrene (PS), polybiphenyl chloride (PVC), epoxy, etc., may be used for the substrate 1.

When chemically tempered glass is used as a material for the substrate 1, the following advantages can be obtained: excellent mechanical properties (vibration, eccentricity, warpage, tilt, etc.,) can be achieved; the hardness of the substrate 1 becomes large; by being chemically stable, it is not likely to be dissolved into various kind of solvent; sand or dust is not likely to adhere to the substrate 1 because it is difficult to be charged compared with the plastic substrate 1; by being chemically tempered, the moisture resistance, oxidization resistance and thermal resistance can be improved, and thus a reliable performance of the magneto-optical recording medium can be ensured for a long period of time; and having an excellent optical property, a high quality signal can be ensured.

Additionally, when the glass or chemically tempered glass is used as a material for the substrate 1, as a method for forming a guide track for guiding a light beam and for forming a signal called prepit formed beforehand on the substrate for recording an address signal, etc, the reactive dry etching method to be carried out on the surface of the glass substrate is used. Alternatively, the guide track or the prepit may be formed on the resin layer by projecting a light beam onto the 2 P layered ultraviolet hardening resin and thereafter by removing the stamper.

When PC is used as a material for the substrate 1, the following advantages can be achieved: because an injection molding is permitted, a mass-production of the same substrate 1 is enabled, and thus the manufacturing cost can be reduced; having low humidity absorption compared with other plastics, a reliable performance of the magneto-optical disk can be ensured for a longer period of time, and excellent heat resistance and impact resistance can be achieved. Additionally, including PC, as to the material which permits injection molding, a guide track, a prepit, etc., can be formed simultaneously on the surface of the substrate 1 when molding only by installing the stamper onto the metal molding mold when injection molding.

When PMMA is used as a material for the substrate 1, the following advantages can be achieved: because injection molding is permitted, a mass-production of the same substrate 1 is enabled, and thus the manufacturing cost can be reduced; and having low double refraction compared with other plastics, it has an excellent optical property, and thus a high quality signal can be ensured; and it has excellent heat resistance and impact resistance.

When APO is used as a material for the substrate 1, the following advantages can be achieved: because injection molding is permitted, a mass-production of the same substrate 1 is enabled, and thus the manufacturing cost can be reduced; having low water absorption compared with other plastics, a reliable performance of the magneto-optical disk can be ensured for a longer period of time, and having a small double refraction compared with other plastics, it has an excellent optical property, and thus a high quality signal can be ensured; and it has high heat resistance and impact resistance.

When PS is used as a material for the substrate 1, the following advantages can be achieved: because injection molding is permitted, a mass-production of the same substrate 1 is enabled, and thus the manufacturing cost can be reduced; and having a low water absorption compared with other plastics, a reliable performance of the magneto-optical disk can be ensured for a longer period of time.

When PVC is used as a material for the substrate 1, the following advantages can be achieved: because injection molding is permitted, a mass-production of the same substrate 1 is enabled, and thus the manufacturing cost can be reduced; having a low water absorption compared with other plastics, a reliable performance of the magneto-optical disk can be ensured for a longer period of time; and it is flame resistance.

When epoxy is used as a material for the substrate 1, the following advantages can be achieved: having a low water absorption compared with other plastics, a reliable performance of the magneto-optical disk can be ensured for a longer period of time; and as being a thermosetting resin, it has an excellent heat resistance.

As described, various materials may be used for the substrate 1; however when adapting the above materials for the substrate 1 of the magneto-optical disk 201, the following optical and mechanical properties are preferably satisfied:

refractive index: 1.44–1.62
double refraction: not more than 100 $\mu$m (double refraction measured by a parallel beam)
transmittance: not less than 90%
deviation in thickness: ±0.1 mm tilt: not more than 10 mrad
vibration acceleration: not more than 10 m/s²
radial direction acceleration: not more than 3 m/s².

The optical head 202 for converging a laser beam onto the recording layer 4 is designed so as to adjust to the refractive index of the substrate 1. Therefore, if the refractive index of the substrate 1 greatly deviates, the laser beam may not be able to be converged sufficiently. Furthermore, if the laser beam is not converged constantly, the temperature distribution of the recording medium (readout layer 3 and the recording layer 4) is subjected to change, thereby adversely affecting the recording and reproducing operations. In the present invention, the temperature distribution of the recording medium when reproducing is especially important. Therefore, the refractive index of the substrate 1 is preferably set within a range of 1.44–1.62.

Since a laser beam is incident through the substrate 1, if double refraction occurs in the substrate 1, the polarization state changes when the laser beam is being transmitted through the substrate 1. In the arrangement of the present invention, a change in the magnetic state of the readout layer 3 is recognized as a change in the polarization state by utilizing the Kerr effect. Therefore, if the polarization state changes when the laser beam is transmitted through the substrate 1, a reproducing operation cannot be carried out. For this reason, double refraction of the substrate 1 measured by parallel light is preferably set below 100 nm.

As to the transmittance, if the transmittance of the substrate 1 becomes too low, for example, when a light beam is transmitted from the optical pickup through the substrate 1 in recording, a light amount reduces. Therefore, in order to retain a light amount sufficient in recording, a laser source designed for higher output is required. Especially, in the arrangement of the present invention, since the recording medium has a doublelayer structure composed of the recording layer 4 and the readout layer 3, compared with the conventional recording medium of singlelayer structure (the readout layer 3 is not provided), a greater amount of light is required for raising the temperature of the recording medium. For this reason, the transmittance of the substrate 1 is preferably set to or above 90 %.

The optical head 202 for converging a laser beam onto the recording layer 4 is designed so as to adjust to the thickness of the substrate 1. Therefore, if the thickness of the substrate 1 greatly deviates, the laser beam may not be able to be converged sufficiently. Furthermore, if the laser beam is not converged under the stable condition, the temperature distribution of the recording medium is subjected to change, thereby adversely affecting the recording and reproducing operations. In the present invention, the temperature distribution of the recording medium when reproducing is especially important. Therefore, the deviation in the thickness of the substrate 1 is preferably set within a range of ±0.1 mm.

If the substrate 1 is tilted, a laser beam from the optical pickup is converged onto the tilted recording medium surface. Thus, the converged state changes depending on the degree of tilt, thereby adversely affecting the recording and reproducing operation as is occurred when the thickness of the substrate 1 deviates. In the present invention, the tilt of the substrate 1 is set below 10 mrad, more preferably below 5 mrad.

When the substrate 1 moves up and down with respect to the optical head 202, the optical head 202 is activated so as to compensate the movement, and a laser beam is converged onto the surface of the recording medium. However, if the substrate 1 greatly moves up and down, it may not be possible to activate the optical head 202 so as to completely compensate the movement. Therefore, the laser beam may not be able to be converged onto the recording medium sufficiently, and thus, the temperature distribution of the recording medium changes, thereby adversely affecting recording and reproducing operations. In the present invention, since the temperature distribution of the recording medium in reproducing is especially important, as to the up and down movement of the substrate 1 in rotating, the vibration acceleration is preferably set to or below 10 m/s².

On the substrate 1, the guide track for guiding a light beam is formed beforehand at 1.0–1.6 μm pitch. However, if an eccentricity exists in the guide track, while the disk is being rotated, the guide track moves in a radial direction with respect to the optical head 202. In this case, the optical head 202 is activated so as to compensate the movement in a radial direction, and a laser beam is converged with a predetermined relationship with the guide track. However, if the guide track is greatly moved in a radial direction becomes, it may not be possible to activate the optical head 202 so as to sufficiently Compensate this movement. Thus, the optical pickup cannot control the light beam so as to be converged with a predetermined relationship from the guide track. As described, in the present invention, the temperature distribution of the recording medium when reproducing is especially important, and thus, as to the movement in a radial direction of the substrate 1 while being rotated, its acceleration in a radial direction is preferably to or below 3 m/s².

There are two methods for directing a converged laser beam to a predetermined position on the magneto-optical disk: successive servo system utilizing a spiral or concentric guide track; and a sample servo system utilizing a spiral or concentric pit string.

Figure 19A:
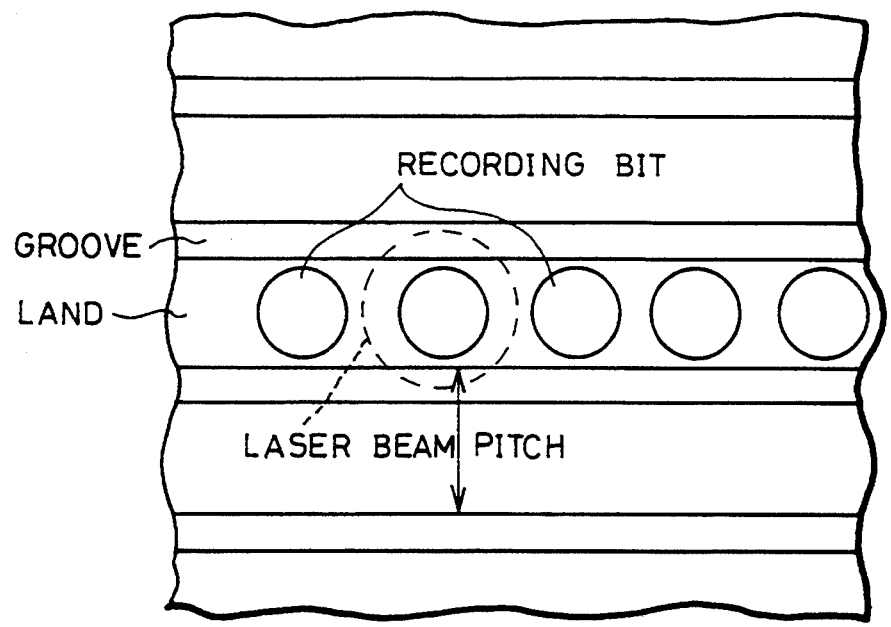
FIG. 19(a) is a plane view showing an example of the respective shapes of lands and grooves formed on a substrate of the magneto-optical disk of FIG. 4.
Figure 19B:
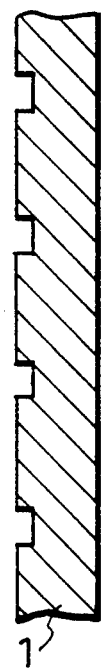
FIG. 19(b) is a cross-sectional view showing an example of the respective shapes of lands and grooves formed on the substrate of the magneto-optical disk of FIG. 4.

As shown in FIGS. 19(a) and 19(b), in the case of a successive servo system, a groove with a width of 0.2–0.6 μm is formed with a depth of substantially λ/(8n) at a pitch of 1.2–1.6 μm, and generally, recording and reproducing of information are carried out on and from the land which is called a land-use magneto-optical disk. Here, λ indicates a wavelength of a laser beam, and n indicates the refractive index of the substrate.

It is very possible to adapt the above generally used method to the present invention. In the present invention, crosstalk from the recording bit on the adjacent tracks can be reduced to a great degree. Therefore, for example, in the case of a magneto-optical disk in which recording and reproducing are carried out on and from the land, even when a groove is formed with a width of 0.1–0.4 μm at a pitch of 0.5–1.2 μm, recording and reproducing operations can be carried out without having an adverse effect of the crosstalk from the adjoining recording bits, thereby significantly improving a recording density.

Figure 20A:
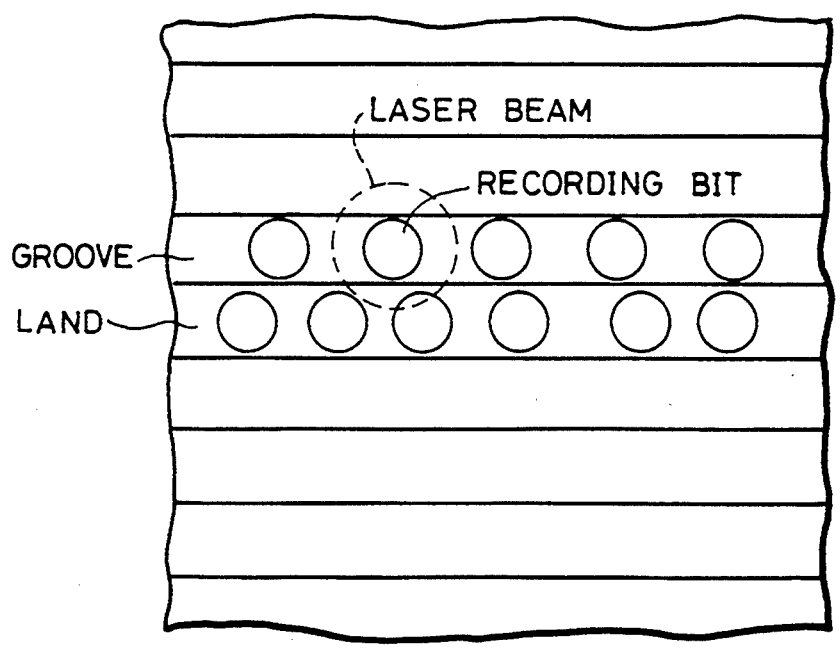
FIG. 20(a) is a plane view showing another example of the respective shapes of lands and grooves formed on the substrate of the magneto-optical disk of FIG. 4.
Figure 20B:
FIG. 20(b) is a cross-sectional view showing another example of the respective shapes of lands and grooves formed on the substrate of the magneto-optical disk of FIG. 4.

As shown in FIGS. 20(a) and 20(b), when the groove and the land are formed with the same width at a pitch of 0.8–1.6 μm, and recording and reproducing operations are carried out on and from both the land and the groove, recording and reproducing operations can be carried out without having an adverse effect of the crosstalk from the adjoining recording bits, thereby significantly improving a recording density.

When a sample servo system is adapted, as shown in FIG. 21, a wobble pit is formed beforehand with a depth of substantially ($\lambda/(4n)$) at pitch of 1.2–1.6 μm. In general, recording and reproducing of information is carried out so as to scan the center of the wobble pit.

It is very possible to adapt the above generally used method to the present invention. In the present invention, crosstalk from the recording bit on the adjacent tracks can be reduced to a great degree. Therefore, for example, in the case of a magneto-optical disk in which a wobble pit is formed at a pitch of 0.5–1.2 μm, recording and reproducing operations can be carried out without having an adverse effect of the crosstalk from the adjoining recording bits, thereby significantly improving a recording density.

As shown in FIG. 22, a wobble pit is formed at a pitch of 0.8–1.6 μm, and recording and reproducing of information are carried out with respect to an area wherein the wobble pit exists in opposite polarity, recording and reproducing operations can be carried out without having an adverse effect of the crosstalk from the adjoining recording bits, thereby significantly improving a recording density.

Figure 23A:
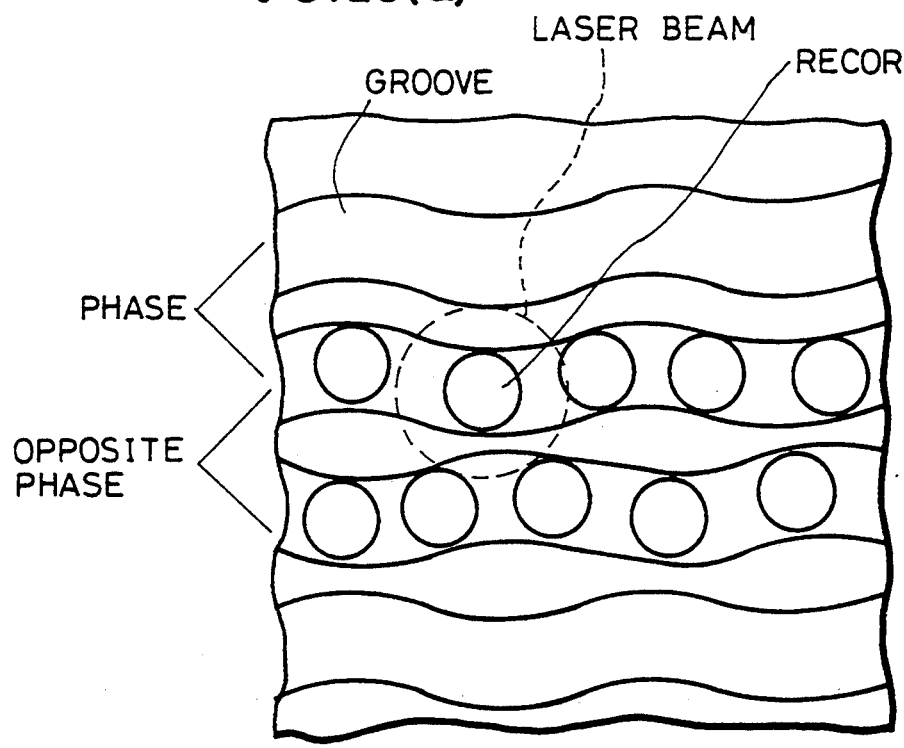
FIG. 23(a) is a plane view showing an example of an arrangement of a wobble groove formed on the substrate of the magneto-optical disk of FIG. 4.
Figure 23B:
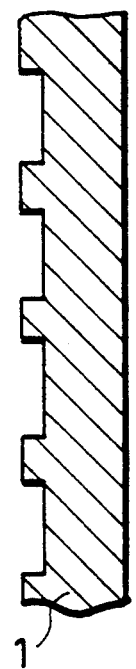
FIG. 23(b) is a cross-sectional view showing an example of the arrangement of a wobble groove formed on the substrate of the magneto-optical disk of FIG. 4.

As shown in FIGS. 23(a) and 23(b), in the above successive servo system, when information indicative of position on the magneto-optical disk is obtained by wobbling the groove, in the area where the wobbling state shows opposite phase, there arises a problem that the crosstalk from the recording bit on the adjoining groove becomes large. However, the present invention permits even in the area where the wobbling state shows opposite phase, crosstalk from the recording bit on the adjoining groove can be prevented, thereby achieving desirable recording and reproducing operations.

Next, the following description deals with the disk format to be adapted in the magneto-optical disk 201 of the present embodiment.

In general, in the magneto-optical disk, in order to maintain the compatibility between different brands and different magneto-optical disks, respective value and duty of the power required in recording and erasing at each radial position are recorded beforehand by a prepit string with a depth of substantially ($\lambda/(4n)$) in a part of an inner or outer circumference. Moreover, based on the read values of the above, a test area is provided in inner or outer circumference wherein recording and reproducing tests can be actually carried out (for example, see IS10089 standard).

As to the reproducing power, information which specifies a reproducing power is recorded in a portion of an inner or outer circumference beforehand in a form of a prepit string.

In the magneto-optical disk 201 of the present invention, the temperature distribution of the recording medium in reproducing greatly affects the reproducing performance. Therefore, the setting of the reproducing power is extremely important.

As a method for setting a reproducing power, for example, the following method is preferable: as in the case of a recording power, a test area for setting a reproducing power is provided on an inner or outer circumference, and information for optimizing the reproducing power obtained from the test area for each radial position is preferable recorded on a part of an inner or outer circumference in a form of a pit string.

Especially, when a magneto-optical disk drive which adapts a CAV system wherein the rotating speed is constant, since the linear velocity of the magneto-optical disk 201 changes depending on the radial position, the reproducing laser power is preferably adjusted for each radial position. Therefore, information segmented in as many areas in radial direction as possible is preferably recorded in a form of a prepit string.

As a method for setting an optimum reproducing laser power each radial position, the following method is available as well: a recording area is divided into a plurality of zones based on a radial position, and the optimum recording power and the reproducing power are set using the test areas provided in the boundary of zones, thereby permitting the temperature distribution of the recording medium to be accurately controlled in reproducing. As a result, desirable recording and reproducing operations can be achieved.

The magneto-optical disk of the present embodiment is applicable to various recording methods such as a method for recording on the initial model of the magneto-optical disk whereon overwriting is not permitted, a recording method of overwriting by the magnetic field modulation and a recording method of overwriting by the light intensity modulation as explained below.

A method for recording on the initial model of the magneto-optical disk whereon overwriting is not permitted is described first.

The initial model of the magneto-optical disk under IS10089 standard (ISO standard set for 5.25"rewritable optical disk) has been popularly used on the market. In writing new information, first erasing of previously recorded information must be carried out from the portion, and then new information can be recorded thereon. Therefore, at least two rotations of the magneto-optical disk are required. Thus, the initial model of the magneto-optical disk presents the problem of low data transfer speed.

On the other hand, the initial model of the magneto-optical disk has an advantage that the properties required for the magnetic films are not as high as the magneto-optical disk whereon overwriting is permitted (to be described later).

In order to overcome the defect that overwriting is not permitted, the following method has been adapted in some devices: for example, a plurality of optical heads are provided so as to eliminate the time loss required for waiting, thereby improving a data transfer speed.

More specifically, two optical heads are used: the optical head in front is used for erasing the recorded information; and the other which follows the above optical head is used for recording new information. In reproducing, either one of the optical heads is used.

In the case where three optical heads are used, the optical head in front is used for erasing the recorded information; the optical head which follows next is used for recording new information; and optical head which follows last is used for verifying that new information is recorded accurately.

Alternatively, the overwriting is permitted by means of a single optical head by arranging such that a plurality of light beams are produced using a beam splitter instead of using a plurality of optical heads.

Therefore, without a process for erasing the information already recorded on the disk, new information can be recorded. Thus, the initial model of the magneto-optical disk can be improved with a function similar to the overwriting function.

As described in the experimental results of the above explanation, it has been proved that the magneto-optical disk 201 of the present invention permits recording, reproducing and erasing operations, which can be used when adapting the recording method of the present invention.

Next, the magnetic field modulation overwrite recording system will be explained.

By the magnetic field modulation overwrite recording system, information is recorded by modulating the intensity of the magnetic field in accordance with the information while a laser of a constant power is being projected onto the magneto-optical recording medium. The magnetic field modulation overwrite recording system will be explained in more detail in reference to FIG. 24.

Figure 24:
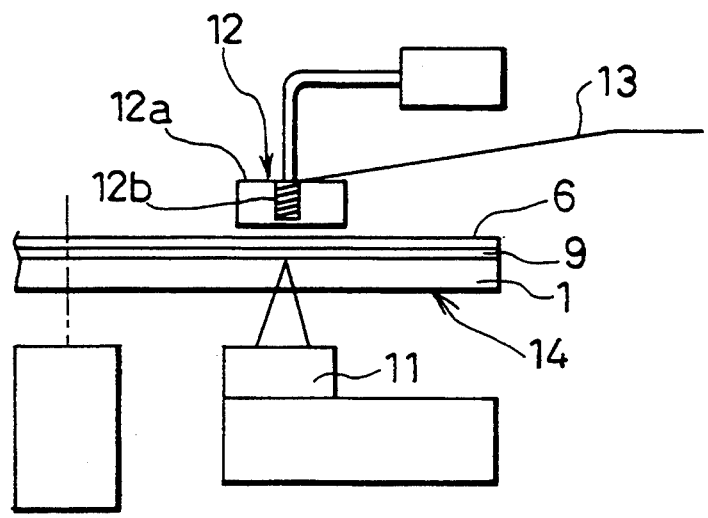
FIG. 24 is an explanatory view which shows a recording method by the magnetic field modulation on the magneto-optical disk of FIG. 4.

FIG. 24 is a typical depiction which shows one example of the magneto-optical disk device whereon overwriting by the magnetic field modulation is permitted. The device is provided with a light source (not shown) for projecting a laser beam in recording and reproducing, an optical head 11 which stores therein a receiving element (not shown) for receiving a reflected light from the magneto-optical disk when recording and reproducing and a floating-type magnetic head 12 which is electrically or mechanically connected to the optical head 11.

The floating-type magnetic head 12 is composed of a slider 12a and a magnetic head 12b which includes a core made of MnZn ferrite, etc., having a coil wound around thereon. The floating-type magnetic head 12 is pressed down toward the magneto-optical disk 14 so as to maintain a predetermined distance of approximately several μm to several tens μm while the magneto-optical disk 14 is being rotated.

In this state, the floating-type magnetic head 12 and the optical head 11 are moved to a desired radial position in the recording area of the magneto-optical disk 14, and a laser beam with a power of 2–10 mW is projected thereon from the optical head 11 so as to raise the temperature of the recording layer 4 to the vicinity of Curie temperature (or the temperature at which coercive force becomes nearly zero). In this state, in accordance with information to be recorded, magnetic field whose magnetization direction reverses upward and downward is applied from the magnetic head 12b. As a result, information can be recorded by the overwrite recording system without having an erasing process of information already recorded on the disk.

In the present embodiment, the laser power used in overwriting by the magnetic field modulation is set constant. However, when the polarity of the magnetic field changes, if the laser power is reduced to a power at which a recording is not permitted, the shape of the recording bit to be recorded can be improved, thereby improving the quality of a reproduced signal.

When carrying out a high speed recording by the magnetic field modulation overwriting, the modulation of the magnetic field must be carried out at high speed. However, the magnetic head 12b has limits in terms of its electric power consumption and size. Therefore, it is not possible for the magnetic head 12b to generate such a large electric field. This means that the magneto-optical disk 14 must be arranged such that a recording operation can be carried out with a relatively small magnetic field.

In considering the above, the magneto-optical disk 201 of the present embodiment, Curie temperature of the recording layer 4 is set low (in a range of 150°–250° C.) so that recoding operation can be easily carried out. Furthermore, by adapting DyFeCo which has small perpendicular magnetic anisotoropy, the magnetic field required for recording can be made smaller. Thus, the magneto-optical disk of the present embodiment has a structure suitable for the magnetic field modulation overwrite system.

Next, a light intensity modulation overwrite recording system will be explained below.

When the light intensity modulation overwrite recording system is adapted, information is recorded in an opposite way to the magnetic field modulation overwrite recording system. Namely, information is recorded by modulating a laser power in accordance with the information to be recorded while a magnetic field of a constant intensity is being applied onto the magneto-optical recording medium. The light intensity modulation recording system will be explained in more detail in reference to FIG. 25 through FIG. 29.

Figure 26:
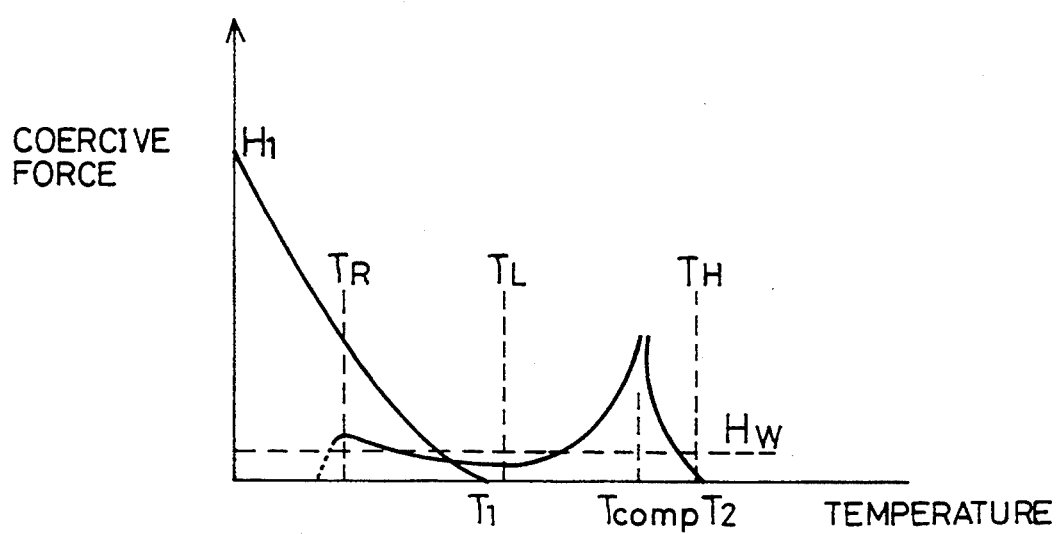
FIG. 26 is an explanatory view which shows temperature dependencies of coercive force of the readout layer and the recording layer suitable for the overwrite recording by the light intensity modulation on the magneto-optical disk of FIG. 4.

FIG. 26 shows the temperature dependency of coercive force in a direction perpendicular to the film surfaces of the readout layer 3 and the recording layer 4 and the recording magnetic field $H_W$ suitable for the overwrite recording method by the light intensity modulation to be described later.

Figure 27:
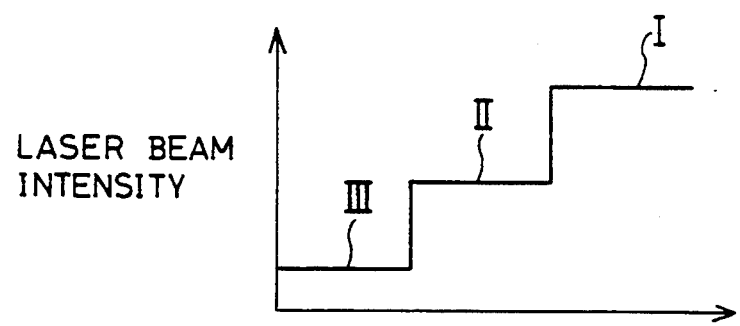
FIG. 27 is an explanatory view showing an example of an intensity of the light beam to be projected onto the magneto-optical disk of FIG. 4 when overwriting by the light intensity modulation and when reproducing.

A recording operation is carried out by projecting a laser beam which is modulated into two levels (high and low) while the recording magnetic field Hw is being applied. Namely, as shown in FIG. 27, when a laser beam of high level I is projected, both the temperatures of the readout layer 3 and the recording layer 4 are raised to $T_H$ which is in the vicinity of or above the respective Curie temperatures $Tc_1$ and $Tc_2$. On the other hand, when a laser beam of low level II is projected, only the temperature of the recording layer 4 is raised to $T_L$ which is above Curie temperature $Tc_2$.

Figure 25:
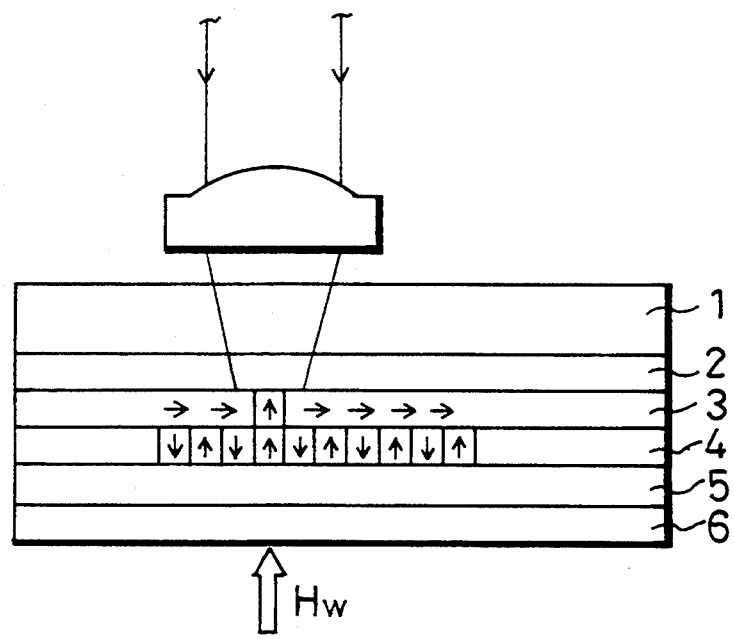
FIG. 25 is an explanatory view which shows an overwrite recording method by the light intensity modulation on the magneto-optical disk of FIG. 4 and also shows the respective magnetization directions in the readout layer and the recording layer.

Therefore, when the laser beam of low level II is projected, since the coercive force $H_1$ of the readout layer 3 is sufficiently small, the magnetization in the readout layer is arranged in the magnetization direction of the recording magnetic field Hw. Furthermore, it is copied to the recording layer 4 in the process of cooling off. Namely, the magnetization becomes upward as shown in FIG. 25.

Next, when a laser beam of high level I is projected, since the temperature of the readout layer 3 is raised above its compensation temperature, the magnetization direction of the readout layer 3 is arranged in an opposite direction to the case of projecting a laser beam of low level II by the recording magnetic field Hw. Namely, the magnetization direction of the readout layer 3 is downward.

In the process of cooling off, the temperature is dropped to a temperature as low as the case of projecting a laser beam of low level II; however, the cooling process of the readout layer 3 and the cooling process of the recording layer 4 are different (the recording layer 4 is cooled off at faster speed). Therefore, only the recording layer 4 has temperature $T_L$ obtained by projecting the laser beam of low level II, and the magnetization direction of the readout layer 3 is copied to the recording layer 4 (downward).

Thereafter, the temperature obtained by projecting the readout layer 3 is cooled off to the temperature of the laser beam of low level II, and the magnetization direction is arranged in the magnetization direction of the recording magnetic field $H_W$ (upward). Here, since the magnetization direction of the recording layer 4 is not arranged in the magnetization direction of the recording magnetic field Hw since its coercive force $H_2$ is sufficiently larger than the recording magnetic field Hw.

In reproducing, with the projection of the laser beam with an intensity level III (FIG. 27), the temperature of the readout layer 3 is raised to $T_R$ (FIG. 26), and a transition occurs in the readout layer 3 from in-plane magnetization to perpendicular magnetization. As a result, both the recording layer 4 and the readout layer 3 exhibit perpendicular magnetic anisotoropy. Here, a recording magnetic field Hw is not applied, or even when it is applied, since the recording magnetic field Hw is significantly smaller than the coercive force $H_2$ of the recording layer 4, in reproducing, the magnetization direction of the readout layer 3 is arranged in the magnetization direction of the recording layer 4 by the exchange coupling force exerted on the interface between the layers.

As described, information can be recorded by the overwrite recording system without a process for erasing information already recorded.

Figure 28:
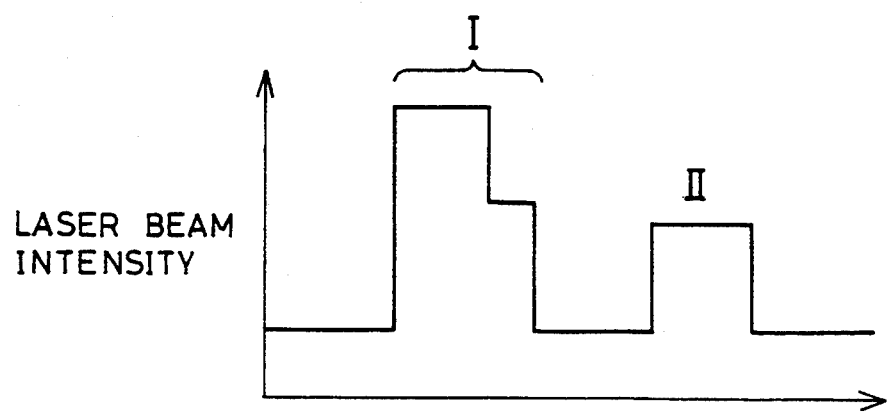
FIG. 28 is an explanatory view showing another example of an intensity of the light beam to be projected onto the magneto-optical disk of FIG. 4 when overwriting by the light intensity modulation and when reproducing.
Figure 29:
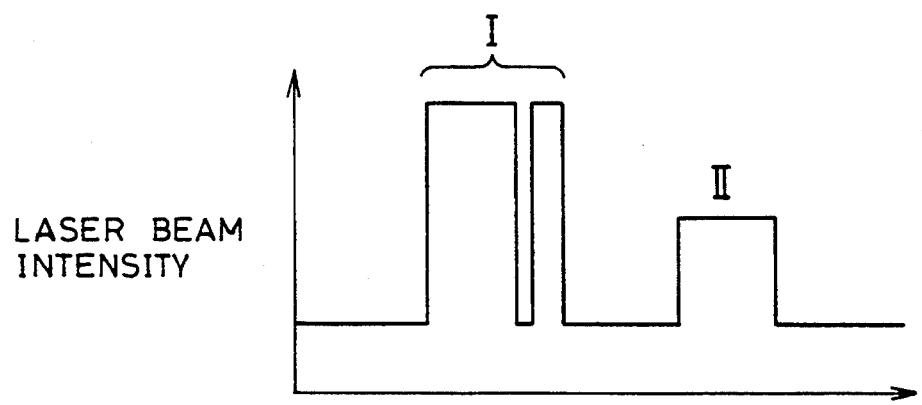
FIG. 29 is an explanatory view showing still another example of an intensity of the light beam to be projected onto the magneto-optical disk of FIG. 4 when overwriting by the light intensity modulation and when reproducing.

A recording operation may be carried out by projecting modulated light beams of two types shown in FIG. 28 or 29, while recording magnetic field Hw is being applied.

Specifically, when a laser beam of high level (type I) is projected, the respective temperatures of the readout layer 3 and the recording layer 4 are raised to $T_H$ which is the vicinity of or above the respective Curie temperatures $T_{c1}$ and $T_{c2}$. On the other hand, when a laser beam of low level (type II) is projected, only the temperature of the recording layer 4 is raised to $T_L$ which is above Curie temperature $T_{c2}$. In this way, the respective cooling off processes of the readout layer 3 and the recoding layer 4 can be set significantly different, especially when the laser beam of high level (type I) is projected. Specifically, the recording layer 4 is cooled off at higher speed. Thus, the rewriting operation can be easily carried out.

Here, after projecting the laser beam of high level (type I), a laser beam of an intensity not less than high level may be projected for a while as long as the intensity thereof is below high level.

The above recording method has an advantage that when overwriting by the light intensity modulation, an initialization-use magnetic field which is generally required can be eliminated.

Figure 30:
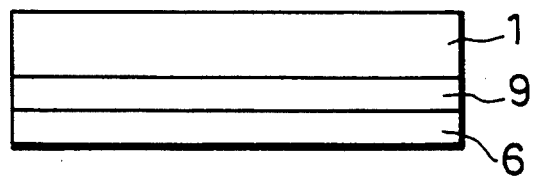
FIG. 30 is an explanatory view showing the magneto-optical disk of a single-sided type of FIG. 4.

The magneto-optical disk (FIG. 4) is a so-called single sided type. For convenience in the explanation, the thin film of the magneto-optical disk, i.e., the transparent dielectric film 2, the readout layer 3, the recording layer 4 and the protective film 5 is referred to as a recording medium layer. Thus, the magneto optical disk is composed of a substrate 1, recording medium layer 9 and the overcoat film 6 as shown in FIG. 30.

Figure 31:
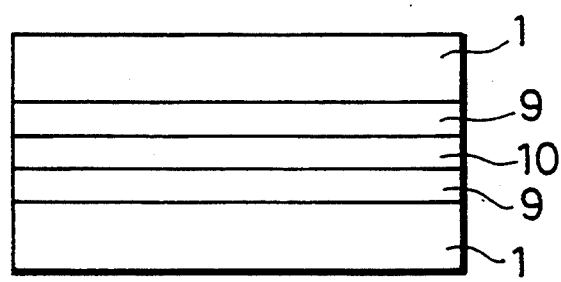
FIG. 31 is an explanatory view showing the magneto-optical disk of double-sided type of FIG. 4.

A so-called both sided magneto-optical disk is shown in FIG. 31. In this type of magneto-optical disk, a pair of the substrates 1 whereon the recording medium layers 9 are respectively laminated by adhesive layer 10 so that respective recording magnetic layers 9 confront one another.

As to the material for the adhesive layer 10, especially, polyurethane acrylate adhesive is preferable. The above adhesive is provided with a combination of the hardening properties obtained by ultraviolet ray, heat and anaerobic. Therefore, this adhesive layer has an advantage that the shadow portion of the recording medium layer 9 through which the ultraviolet ray is not transmitted can be hardened by heat and anaerobic. Moreover, because of its high moisture resistance, a reliable performance of the magneto-optical disk of double-sided type can be ensured for a long period of time.

On the other hand, the magneto-optical disk of a single-sided type is suitable for a compact magneto-optical recording and reproducing device because the required thickness is as thin as ½ of that required for the both-sided magneto-optical disk.

The magneto-optical disk of a double-sided type is suitable for the large capacity magneto-optical recording and reproducing device because both sides can be used for recording and reproducing.

In determining which type of the magneto-optical disk is suitable (both-sided or signal-sided), the thickness and the capacity of the magneto-optical disk should be considered as explained above. Which recording method is adapted is also an important factor to be considered as explained below.

As well known, in recording information on the magneto-optical disk, light beam and magnetic field are used. As shown in FIG. 24, in the magneto-optical disk device, a light beam is emitted from a light source such as a semiconductor laser so as to be converged onto the recording medium layer 9 by the converging lens through the substrate 1. Further, by a magnetic field generation unit (for example, a floating-type magnetic head 12) such as a magnet, an electro-magnet, provided so as to confront the light source, magnetic field is applied onto the recording medium layer 9. In recording, by setting the light beam intensity higher than the light beam used in reproducing, the temperature of the portion having converged thereon a light beam of the recording medium layer 9 is raised. As a result, coercive force of the magnetic film at the portion becomes smaller. In this stage, by externally applying a magnetic field with a size larger than the coercive force, the magnetization direction of the magnetic film is arranged in the magnetization direction of the applied magnetic field, thereby completing the recording process.

For example, in the overwrite method by magnetic field modulation wherein the recording-use magnetic field is modulated according to the information to be recorded, the magnetic field generating device (an electro-magnet in most cases) is required to set at the closest possible position to the recording medium layer 9. This is because in considering heat generated from the coil of the electro-magnet, electric power consumption of the device, etc., the size of magnetic field generating device, etc., in order to-set the magnetic field to be modulated at a frequency required for recording (in general several hundreds kHz to several tens MHz) and the magnetic field required for recording (in general 50 Oe–several hundreds Oe), the magnetic field generating device is required to be set to a distance of 0.2 mm or below, more preferably to 50 μm. In the case of the both-sided type magneto-optical disk, the substrate 1 normally has the thickness of 1.2 mm and at least 0.5 mm is required. Thus, when the electro-magnet is placed so as to confront the light beam, the magnetic field sufficient for recording cannot be ensured. For this reason, in the device having a recording medium layer 9 designed for overwriting by the magnetic field modulation, the single-sided type magneto-optical disk is often used.

In the case of the overwrite method by the light intensity modulation wherein a light beam is modulated according to information to be recorded, recording can be carried out with a recording-use magnetic field whose magnetization is fixed in one direction, or without a recording-use magnetic field. Therefore, for example, a permanent magnet which has a strong power for generating magnetic field may be used. Thus, the magnetic field modulation is not required to be set at the closest possible position unlike the case of the magnetic field modulation. The distance of several mm is permitted between the recording medium layer 9 and the magnetic field generating unit. Therefore, not only the single-sided type but also both-sided type magneto-optical disk are applicable as well.

The single-sided type magneto-optical disk of the present embodiment may be varied in the following ways:

As a first example, a magneto-optical disk having a hard coat layer on the overcoat film 6 may be used. The magneto-optical disk is composed of a substrate 1, recording medium layer 9, an overcoat film 6 and a hard coat layer. Here, for example, an acrylate family ultraviolet ray hardening type hard coat resin film (hard coat layer) is formed on the overcoat film 6, for example, made of a polyurethan acrylate family ultraviolet ray hardening type resin with a thickness of substantially 6 $\mu$m. The film thickness of the hard coat layer may be set at 3 $\mu$m.

In the above arrangement, since the overcoat film 6 is formed, the deterioration in the property of the recording medium layer 9 due to the oxidization can be prevented, thereby ensuring a reliable recording and reproducing operation for a long period of time. Additionally, since the hardcoat film made of a hard material and has large wear resistance is provided, even if the magnet for use in recording is in contact with the disk, the disk is not easily scarred, or even if it is scarred, the scar would not reach the recording medium layer 9.

Alternatively, the overcoat film 6 may be arranged so as to be served also as a hardcoat film.

As a second example of the single-type magneto-optical disk of the present embodiment, the magneto-optical disk having a hardcoat layer formed on the overcoat film 6, and the magneto-optical disk is composed of the hardcoat film, a substrate 1, a recording medium layer 9, an overcoat film 6, and another hardcoat film.

As to the material for the substrate 1 of the magneto-optical disk, a plastic such as PC is generally used. However, since the plastic is a very soft material compared with a glass material, it is easily scarred even with a small rub by nail. If the disk is badly scarred, the problem of servo jump may occur in recording or reproducing using a light beam, and consequently, the recording and reproducing operations may not be performed properly.

When reproducing from the magneto-optical disk 201 of the present embodiment, only the vicinity of the center of the light beam is subjected to reproducing. Thus, compared with the case of the conventional model, an adverse effect of the scar on the surface of the substrate 1 in recording or reproducing becomes greater. In order to counteract this problem, in the arrangement of the present embodiment, the hardcoat film is provided on an opposite side the recording medium layer 9 of the substrate 1. This arrangement of the present embodiment is very effective in preventing the disk from being scarred.

The same effect can be obtained for the both-sided type magneto-optical disk as well by providing a hard-coat film on the surface of each substrate 1.

As a third example, a charge preventing layer (not shown) is formed on the overcoat film 6 or the hard coat layer of the first or the second example. Alternatively, a layer provided with a charge preventing function may be formed in the magneto-optical disk.

As in the case of the problem of the scar, if the dust adheres to the surface of the substrate 1, it may become impossible to perform recording or reproducing operation. In the case of adapting the overwrite method by the magnetic field modulation, if dust adheres onto the overcoat film 6, especially when the floating-type magnetic head 12 (FIG. 24) is placed above the overcoat film 6 with a gap of several $\mu$m, the floating-type magnetic head 12 and the recording medium layer 9 may be damaged due to the dust.

However, in the arrangement of the present embodiment, since a layer provided with a charge preventing function is formed on the substrate 1 or the recording medium layer side surface, the substrate 1 and the overcoat film 6 can be prevented from dust adhering thereon.

When reproducing from the magneto-optical disk of the present embodiment, only the portion corresponding to the vicinity of the center of the light is subjected to reproduction. Therefore, since an adverse effect of the scar on the surface of the substrate in recording or reproducing becomes greater than the conventional case, the above arrangement for preventing dust adhering onto the surface is very effective.

As to the charge preventing film, for example acrylic family hard coat resin may be used whereon an electrically conductive filler is mixed, with a thickness of substantially 2–3 $\mu$m may be used.

The charge preventing film is provided for decreasing the surface resistance so that the surface of the substrate 1 is prevented from adhering to dust irrespectively of the material used in the substrate 1, i.e., plastic or glass.

Needless to say, it may be arranged such that the overcoat film 6 or the hardcoat layer is provided with a charge preventing effect.

As to the magneto-optical disk of both-sided type, the arrangement of the present invention is applicable to the respective surfaces of the substrates 1.

As a fourth example, a lubricant film (not shown) may be formed on the overcoat film 6. The magneto-optical disk is composed of the substrate 1, the recording medium layer and the overcoat film 6 and a lubricant film. As to the material for the lubricant film, for example, a fluorocarbon resin may be used, and the film thickness is substantially 2 $\mu$m.

Since the lubricant film is provided, when overwriting through the magnetic field modulation using the floating-type magnetic head 12, lubricating properties between the floating-type magnetic head 12 and the magneto-optical disk may be improved.

The floating-type magnetic head 12 is positioned above the recording medium layer 9 with a gap of several $\mu$m to several tens $\mu$m. Namely, the pressing force from the suspension 13 exerted onto the floating magnetic head 12 towards the recording medium layer 9 and the floating force generated by the air flow due to the rotations of the disk exerted so as to apart the floating magnetic head 12 from the disk balance with one another, thereby maintaining a predetermined distance between the head 12 and the disk.

Using the floating-type magnetic head 12, in the case of adapting the described CSS (contact-Start-Stop) method, the floating-type magnetic head and the magneto optical disk are in contact with one another until the magneto-optical disk reaches a predetermined rotation speed after it starts rotating and until the disk is completely stopped after the switch is turned off. In this method, if a seizure occurs between the floating-type magnetic head 12 and the magneto-optical disk, the floating-type magnetic head 12 may be damaged when the magneto-optical disk starts rotating.

However, in the arrangement of the magneto-optical disk of the present embodiment, since a lubricant film is formed on the overcoat film 6, the lubricating properties between the floating-type magnetic head 12 and the magneto-optical disk 201 can be improved, thereby preventing the floating-type magnetic head 12 from being damaged by the seizure.

Needless to say, if a moisture resistance and protective material which prevents the deterioration of the recording medium layer 9 is used, it is not necessary to provide the overcoat film 6 and the lubricant film separately.

As a fifth example, the magneto-optical disk of the present embodiment may be arranged such that a moisture-proof layer (not shown) and the second overcoat film (not shown) are laminated on the side opposite to the side of the recording medium layer 9. The magneto-optical disk is composed of the overcoat film, the moisture-proof layer, the substrate 1, the recording medium layer 9 and the overcoat film 6.

As to the material for the moisture-proof layer, a transparent dielectric material such as AlN, AlSiN, SiN, AlTaN, SiO, ZnS or $TiO_2$ may be used, and the suitable thickness for the moisture-proof layer is approximately 5 nm. The second overcoat film is effective especially when a high moisture permeability plastic material such as PC is used in the substrate 1.

The moisture-proof layer is effective in suppressing a change in the warpage of the magneto-optical disk with respect to a change in an environmental humidity as explained below.

In the case where the moisture-proof layer is not provided, for example, if the environmental moisture is greatly changed, moisture is absorbed or released in or from only the side where the recording medium layer 9 is not provided, i.e., the light incident side of the plastic substrate 1. Due to this moisture absorption and release, a partial change in the volume of the plastic substrate 1 occurs thereby presenting the problems that the plastic substrate 1 may be warped.

This warpage of the substrate 1 occurs when the substrate 1 is tilted with respect to the optical axis of the light beam used in reproducing or recording information. Therefore, servo may be displace, and thus the problem is presented in that the signal quality is lowered. If the servo is greatly displaced, a servo skip may occur.

Additionally, when the substrate 1 is tilted, a laser beam from the optical head 11 (see FIG. 24) is converged on the tilted surface of the recording medium layer 9, and thus the converged state of the light beam changes according to the degree of the tilt, thereby adversely affecting the recording and reproducing operations.

Furthermore, when the substrate 1 is moved up and down with respect to the optical head 11, the optical head 11 is activated so as to compensate this movement of the substrate 1 and to converge the laser beam onto the surface of the recording medium layer 9. However, when the substrate 1 is greatly moved up and down, the optical head 11 cannot compensate this movement.

Thus, the laser beam is not converged sufficiently, and this presents the problem that the temperature distribution of the recording medium layer 9 changes, thereby adversely affecting the recording and reproducing operation. Especially, in the arrangement of the present application, the temperature distribution of the recording medium layer 9 when reproducing is important. Therefore, it is necessary to prevent warpage of the substrate 1 and a change in the warpage due to an environmental change as much as possible.

In the arrangement of the magneto-optical disk of the present embodiment, since the moisture-proof layer is provided, the moisture absorption and release on the surface side of the substrate 1 can be significantly suppressed. Thus, the above arrangement is suitable especially for the magneto-optical disk 201 of the present embodiment.

The second overcoat film on the moisture-proof layer prevents the moisture-proof layer from being scarred and for protecting the surface of the substrate 1, and the same material as the material used in the overcoat film 6 on the recording medium layer 9 may be used.

Additionally, the hardcoat layer of the charge preventing layer may be provided in lieu of the second overcoat film, or may be provided on the second overcoat film.

In the optical head 202 of the present embodiment, the number of aperture of the objective lens 104 is set to 0.55, and the wavelength of the laser beam from the semiconductor laser 101 was set to 780 nm. However, the present invention is not limited to the above. For example, by setting the number of aperture within a range of 0.6–0.95, a diameter of the central portion of the light spot can be made still shorter, thereby achieving a still higher recording density.

Additionally, with a use of a laser beam with a shorter wavelength such as an argon ion laser beam, or a laser beam with a wavelength of 335–600 nm utilizing a SHG (Second Harmonic Generation) element, a diameter of the central portion of the light spot can be made still shorter, thereby improving a recording density.

[EMBODIMENT 2]

The second embodiment of the present invention will be explained below with reference to FIG. 32. For convenience in the explanation, members having the same functions as those of the previous embodiments will be designated by the same code, and the descriptions thereof shall be omitted here.

Figure 32:
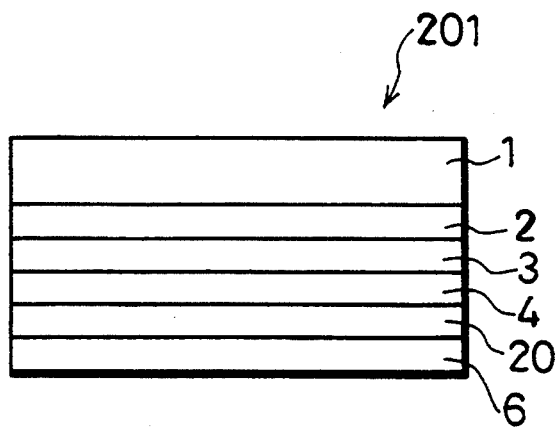
FIG. 32 which shows the second embodiment is a view showing a schematic configuration of a magneto-optical disk used in the magneto-optical disk device.

As shown in FIG. 32, the magneto-optical disk 201 of the present embodiment is composed of a substrate 1 whereon a transparent dielectric film 2, a readout layer 3, a recording layer 4, a radiating film 20, an overcoat film 6 are laminated in this order. The optical head 202 (FIG. 1) is the same as that of the previous embodiment.

As to a material for the radiating film 20, Al may be used, and the thickness of the film is preferably set in the vicinity of 100 nm. As to the material for the substrate 1, the transparent dielectric film 2, the readout layer 3, the recording layer 4 and the overcoat film 6, the materials used in the previous embodiment may be used.

In the present embodiment, the radiating film 20 is formed on the recording layer 4, and thus the shape of the recording bit can be sharpened for the following reasons:

Most of the light beam incident from the light incident side of the magneto-optical disk 201 is absorbed by the readout layer 3 and the recording layer 4 and is charged into heat. In this case, the heat is conducted in a vertical direction of the readout layer 3 and the recording layer 4, and is conducted in a horizontal direction of the layers as well.

Here, if the amount of heat transferred in the horizontal direction is large, and the heat is transferred at low speed, in the case of high speed and high density recording, the problem is presented in that an adverse thermal effect occurs on the recording bit to be recorded next.

If this occurs, the length of the recording bit becomes longer than a predetermined length. Moreover, a recording bit extended in the horizontal direction with respect to the guide track may be formed. If the recording bit is extended in the horizontal direction, the amount of crosstalk may increases, thereby presenting the problem that a desirable recording and reproducing operation cannot be performed.

In the arrangement of the present embodiment, the radiating film 20 made of Al having the high thermal conductivity is formed on the recording layer 4. The heat conducted in a horizontal direction can be released to the side of the radiating film 20, i.e., in a vertical direction, thereby reducing the amount of heat conducted in the horizontal direction. Therefore, recording can be carried out without having a thermal interference under the high density and high speed recording conditions.

By providing the radiating film 20, in the case of recording by the light intensity modulation, the following advantages can be obtained.

Since the radiating film 20 is provided, in the process of recording, when the area having a temperature rise by the projection of the light beam is cooled off, the difference of a change in the temperature of the readout layer 3 and the recording layer 4 can be made more significant.

Especially in the case of projecting a laser beam of high level, the respective cooling off speed of the readout layer 3 and the recording layer 4 can be set greatly different (the recording layer 4 is cooled off at faster speed), thereby making easier the rewriting process.

Al used in the radiating film 20 has a higher thermal conductivity compared with the rare-earth transition metal alloy used in the readout layer 3 and the recording layer 4. Thus, Al is a suitable material for the radiating film 20. Additionally, in the case of using AlN for the transparent dielectric film 2, the following advantages can be achieved. AlN is formed by reactively sputtering an Al target by Ar and $N_2$ gas, and the radiating film 20 can be easily formed by sputtering the same Al target by Ar gas. Additionally, Al can be obtained at a reasonable price.

However, the suitable material for the radiating film 20 is not limited to Al. Other materials may be used as long as they have larger thermal conductivities than the readout layer 3 and the recording layer 4. For example, Au, Ag, Cu, SUS, Ta or Cr may be used as well.

When Adapting Au, Ag or Cu for the radiating film 20, by being superior in terms of oxidization resistance, humidity resistance and corrosion resistance, a reliable performance of the film can be ensured for a long period of time.

When adapting SUS, Ta or Cr for the radiating film 20, by being superior in terms of oxidization resistance, humidity resistance and corrosion resistance, a reliable performance of the film can be ensured for a long period of time.

In the present embodiment, the thickness of the radiating film 20 is set at 100 nm. However, a long-run reliability can be improved by making the film thicker. However, in considering the recording sensitivity of the magneto-optical disk as described earlier, the film thickness is required to be set in accordance with the thermal conductivity and the specific heat, and thus it is preferably set in a range of 5–200 nm, more preferably set in a range of 10–100 nm. By adapting the material having a relatively high heat conductivity and a superior corrosion resistance, the film thickness can be set in a range of 10–100 nm, and thus the time required for forming the film can be reduced in the manufacturing process.

Alternatively, a dielectric film (not shown) may be provided between the recording layer 4 and the radiating film 20. As to the material for the dielectric film, the same material used in the transparent dielectric film 2 may be used such as AlN, SiN, AlSiN, etc., used in the first embodiment. Especially when a nitride film made of AlN, SiN, AlSiN, TiN, AlTaN, ZnS, BN, etc., which does not include oxygen is used, a reliable performance of the magneto-optical disk can be ensured for a long period of time. Here, the thickness of the dielectric film is preferably set in a range of 10–100 nm.

[EMBODIMENT 3]

The third embodiment of the present invention will be explained below in reference to FIG. 33. For convenience in the explanation, members having the same functions as those in the previous embodiments will be designated by the same code, and the descriptions thereof shall be omitted here.

Figure 33:
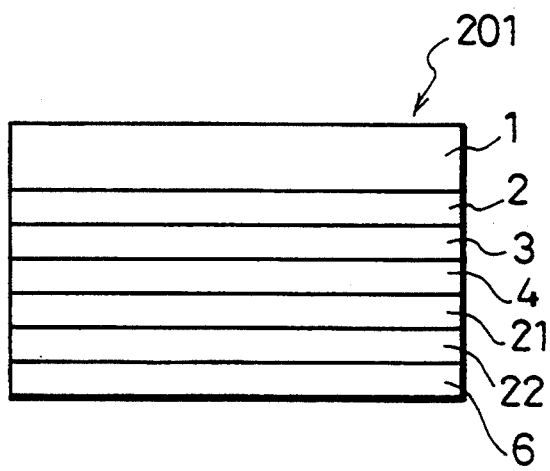
FIG. 33 which shows the third embodiment is a view showing a schematic configuration of a magneto-optical disk used in the magneto-optical disk device.

As shown in FIG. 33, a magneto-optical disk device of the present embodiment is different from that of the previous embodiment in that it is composed of a substrate 1 whereon a transparent dielectric film 2, a readout layer 3, a recording layer 4, a transparent dielectric film 21, a reflective film 22 and an overcoat film 6 are laminated in this order. However, the optical head 202 (FIG. 1) is the same as that of the previous embodiment.

As to the material for the transparent dielectric film 21, for example AlN may be used, and the thickness thereof is preferably set approximately at 30 nm. As to the material for the substrate 1, the transparent dielectric film 2, the readout layer 3, the recording layer 4 and the overcoat film 6, the same materials as those in the previous embodiment may be used. However, the thickness of the readout layer 3 is set at 15 nm which is the half of the readout layer 3 used in the first embodiment. The thickness of the recording layer 4 is also set at 15 nm which is the half of the recording layer 4 of the first embodiment. Thus the respective film thicknesses of the readout layer 3 and the recording layer 4 are set very thin (30 nm for both).

Namely, in the case of the magneto-optical disk 201 of the present embodiment, a portion of a light beam incident thereto is transmitted through the readout layer 3 and the recording layer 4, and further transmitted through the transparent dielectric film 21, and thus it is reflected from the reflective film 22.

In the above arrangement, a reflected light from the surface of the readout layer 3 and a reflected light from the reflective film 22 and transmitted again through the recording layer 4 and the readout layer 3 interferes with one another. Thus, the polar Kerr rotation angle becomes larger by enhancing the magneto-optical Kerr effect. As a result, information can be reproduced with higher accuracy, thereby improving the quality of the reproduced signal.

In the arrangement of the present embodiment, in order to increase the enhance effect for the magneto-optical Kerr effect, the thickness of the transparent dielectric film 2 is preferably set at 70–100 nm, and the film thickness of the transparent dielectric film 21 is preferably set at 15–50 nm.

The transparent dielectric film 2 is preferably set in a range of 70–100 nm because when the film 2 is set in this range, the enhance effect of the polar Kerr rotation angle is maximized as explained in the first embodiment.

The greater polar Kerr rotation angle can be achieved by making thicker the film thickness of the transparent dielectric film 21. However, the reflectance becomes smaller on the contrary, and if the reflectance becomes too small, a stable servo cannot be carried out because a signal for carrying out a servo on the guide track becomes small. Therefore, the film thickness of the transparent dielectric film 21 is preferably set in a range of 15–50 nm.

The enhance effect can be increased by setting the refractive index of the transparent dielectric film 21 greater than that of the transparent dielectric film 2.

The readout layer 3 and the recording layer 4 are both made of rare earth transition metal alloy, and has high light absorptance. Therefore, if the total thickness of the readout layer 3 and the recording layer 4 is set above 50 nm, a light beam is hardly transmitted therethrough, and thus enhance effect for the magneto-optical Kerr effect cannot be obtained. Thus, the total film thickness of the readout layer and the recording layer 4 is preferably set in a range of 10–50 nm.

If the film thickness of the reflective film 22 becomes too thin, a light is transmitted through the reflective film 22, and the enhance effect for the magneto-optical Kerr effect is reduced. Thus, the film thickness of at least 20 nm is required. On the other hand, if the film thickness of the reflective film 22 becomes too thick, a large power is required for recording and reproducing, and thus the recording sensitivity of the magneto-optical disk is lowered. Thus, the film thickness is preferably set below 100 nm. Accordingly, the film thickness of the reflective film 22 is preferably set in a range of 20–100 nm.

As to the material for the reflective film 22, Al is preferably used because of its large reflective index (around 80%) in a wavelength range of semiconductor laser. Moreover, when forming AlN by sputtering, the same Al target can be used as when forming AlN of the transparent dielectric film 2. As described, when forming AlN, a reactive sputtering is carried out by introducing a mixed gas of Ar and $N_2$ or $N_2$ gas, and when forming Al used in the reflective film 22, sputtering is carried out by introducing Ar gas.

The suitable material for the reflective film is not limited to Al, and other materials may be used as long as it has a reflectance of above 50% in a wavelength range of the light beam, such as Au, Pt, Co, Ni, Ag, Cu, SUS, Ta or Cr.

When adapting Au, Pt, Cu or Co to the reflective film 22, because of its high oxidization resistance, humidity resistance, corrosion resistance, etc., reliable performance of the film can be ensured for a long period of time.

When adapting Ni to the reflective film 22, because of its small heat conductivity, the magneto-optical disk has high recording sensitivity. Moreover, the disk has high oxidization resistance, high humidity resistance, high corrosion resistance, etc., thereby ensuring a reliable performance of the disk for a long period of time.

When adapting Ag to the reflective film 22, because of its high oxidization resistance, high humidity resistance and high corrosion resistance, a reliable performance of the film 22 can be ensured for a long period of time. Moreover, Ag target can be obtained at reasonable price.

When adapting SUS, Ta or Cr, because of its high oxidization resistance, high humidity resistance and high corrosion resistance, a reliable performance of the magneto-optical disk can be ensured for a loner period of time.

Although the above explanations have been given through the case of the magneto-optical disk device as a magneto-optical recording and reproducing device in the above first through third embodiments. However, the present invention is not limited to this, and it is equally applicable to the magneto-optical card device and the magneto-optical tape device as well. Additionally, in the case of the magneto-optical tape, instead of the rigid substrate 1, a flexible tape base, for example, a base made of polyethlene terephtalate may be used.

As described, in the magneto-optical disk device of the present invention, the magneto-optical disk 201 which permits a reproduction of recorded information by projecting thereon a light beam is used. The information is recorded in each direction of perpendicular magnetization. In reproducing, a laser beam is projected onto the portion whereon information is recorded, and the information is reproduced based on a change in the Kerr rotation angle with respect to the reflected light from the portion.

The magneto-optical disk device is provided with the semiconductor laser 101 as a light source, the objective lens 105 for converging a light beam from the semiconductor laser 101 onto the magneto-optical disk 201 and the light interrupting plate 120 for interrupting a portion of the light beam from the semiconductor laser 101 before it is incident onto the objective lens 105.

The magneto-optical disk 201 includes the readout layer 3 which is predominant in in-plane magnetization at room temperature, and in which as the temperature thereof is raised, a transition occur to be predominant in perpendicular magnetization and the recording layer 4 for recording thereon information using each direction of perpendicular magnetization.

In the above arrangement, since the light interrupting plate 120 is provided, the central portion having a high intensity of the light spot formed on the readout layer can be made smaller. Thus, reproduction of the information recorded on the recording layer at high density is enabled through the readout layer 3, thereby achieving a significant improvement in the recording density.

Moreover, even if the side robe is generated by the light interrupting plate 120, and thus a portion having a relatively high intensity is generated on both sides of the central portion of the light spot, in-plane magnetization is maintained in the readout layer 3 on both sides of the central portion. Thus, interference by reproducing signals from the sides of the central portion to reproducing signals from the central portion of the light spot can be prevented, thereby improving a reproducing signal quality of information reproduced through the readout layer 3.

While this invention has been disclosed in conjunction with specific embodiments thereof, it is evident that many alternatives, modifications and variations will be apparent to those skilled in the art in light of the foregoing description accordingly, it is intended to embrace all such alternatives, modifications and variations as fall within the spirit and broad scope of the appended claims.

What is claimed is:

1. A magneto-optical recording and reproducing device comprising:

a magneto-optical recording medium for reproducing therefrom recorded information using light;

a light source for producing a light beam;

an objective lens for converging a light beam emitted from said light source onto said magneto-optical recording medium; and a light interrupting member for interrupting a portion of the light beam emitted from said light source before it is incident onto said objective lens so as to divide the light beam into a main robe whose light intensity distribution is made narrower and side robes formed on both sides of the main robe, wherein said magneto-optical recording medium includes:

a readout layer which is predominant in in-plane magnetization at room temperature, and in which a transition occurs to be predominant in perpendicular magnetization as temperature thereof is raised above a predetermined temperature; and a recording layer for recording thereon information using a perpendicular magnetization.

2. The magneto-optical recording and reproducing device as set forth in claim 1, wherein said readout layer and said recording layer of said magneto-optical recording medium are laminated each other.

3. The magneto-optical recording and reproducing device as set forth in claim 2, wherein said magneto-optical recording medium further includes a substrate which has a property that light can be transmitted therethrough; and a transition occurs from in-plane magnetization to perpendicular magnetization in said readout layer formed on said substrate as temperature of said readout layer is raised by projecting a light beam from said light source.

4. The magneto-optical recording and reproducing device as set forth in claim 1, wherein said magneto-optical recording medium is a magneto-optical disk, said light interrupting member which is substantially formed in a rectangular shape interrupts a central portion of the light beam, and a lengthwise direction thereof is set along a radial direction of said magneto-optical disk, and in-plane magnetization in said readout layer is maintained in said readout layer even when temperature thereof is raised due to a side robe generated in a track direction of said magneto-optical disk by said light interrupting member.

5. The magneto-optical recording and reproducing device as set forth in claim 1, wherein said readout layer of said magneto-optical recording medium is a rare-earth transition metal alloy film made of GdFeCo.

6. A magneto-optical recording and reproducing device comprising:

a magneto-optical recording medium for reproducing therefrom recorded information using light;

a light source for producing a light beam;

an objective lens for converging a light beam emitted from said light source onto said magneto-optical recording medium; and a light interrupting member for interrupting a portion of the light beam emitted from said light source before it is incident onto said objective lens, wherein said magneto-optical recording medium includes:

a readout layer which is predominant in in-plane magnetization at room temperature, and in which a transition occurs to be predominant in perpendicular magnetization as temperature thereof is raised; and a recording layer for recording thereon information using a perpendicular magnetization;

wherein said readout layer of said magneto-optical recording medium is a rare-earth transition metal alloy film made of GdFeCo, wherein said readout layer of said magneto-optical recording medium is made of $Gd_X(FE_{0.8-2}Co_{0.18})_{1-X}$, where a composition rate X satisfies the following inequality: $0.19 < X < 0.29$.

7. The magneto-optical recording and reproducing device as set forth in claim 6, wherein the composition rate X is 0.26.

8. The magneto-optical recording and reproducing device as set forth in claim 1, wherein said recording layer of said magneto-optical recording medium is a rare-earth transition metal alloy thin film made of DyFeCo.

9. A magneto-optical recording and reproducing device comprising:

a magneto-optical recording medium for reproducing therefrom recorded information using light;

a light source for reproducing a light beam;

an objective lens for converging a light beam emitted from said light source onto said magneto-optical recording medium; and a light interrupting member for interrupting a portion of the light beam emitted from said light source before it is incident onto said objective lens, wherein said magneto-optical recording medium includes:

a readout layer which is predominant in in-plane magnetization at room temperature, and in which a transition occurs to be predominant in perpendicular magnetization as temperature thereof is raised; and a recording layer for recording thereon information using a perpendicular magnetization;

wherein said recording layer of said magneto-optical recording medium is a rare-earth transition metal alloy thin film made of DyFeCo, wherein DyFeCo has a composition from $DY_X(Fe_Y Co_{1-Y})_{1-X}$, where a composition rate X satisfies the following inequality: $0.24 < X < 0.33$, and a composition rate Y is selected at random.

10. A magneto-optical recording and reproducing device comprising:

a magneto-optical recording medium for reproducing therefrom recorded information using light;

a light source for producing a light beam;

an objective lens for converging a light beam emitted from said light source onto said magneto-optical recording medium; and a light interrupting member for interrupting a portion of the light beam emitted from said light source before it is incident onto said objective lens, wherein said magneto-optical recording medium includes:

a readout layer which is predominant in in-plane magnetization at room temperature, and in which a transition occurs to be predominant in perpendicular magnetization as temperature thereof is raised; and a recording layer for recording thereon information using a perpendicular magnetization;

wherein said recording layer of said magneto-optical recording medium is a rare-earth transition metal alloy thin film made of DyFeCo, wherein said recording layer is made of $Dy_{0.23}(Fe_{0.78}Co_{0.22})_{0.77}$ whose Curie temperature is in a vicinity of 200° C.

11. A magneto-optical recording and reproducing device comprising:

a magneto-optical recording medium for reproducing therefrom recorded information using light;

a light source for producing a light beam;

an objective lens for converging a light beam emitted from said light source onto said magneto-optical recording medium; and a light interrupting member for interrupting a portion of the light beam emitted from said light source before it is incident onto said objective lens, wherein said magneto-optical recording medium includes:

a readout layer which is predominant in in-plane magnetization at room temperature, and in which a transition occurs to be predominant in perpendicular magnetization as temperature thereof is raised; and a recording layer for recording thereon information using a perpendicular magnetization;

wherein said readout layer of said magneto-optical recording medium is made of $Ho_X(Fe_YCo_{1-Y})_{1-X}$, where a composition rate X satisfies the following inequality: $0.25 < X < 0.45$, and a composition rate Y is selected at random.

12. A magneto-optical recording and reproducing device comprising:

a magneto-optical recording medium for reproducing therefrom recorded information using light;

a light source for producing a light beam;

an objective lens for converging a light beam emitted from said light source onto said magneto-optical recording medium; and a light interrupting member for interrupting a portion of the light beam emitted from said light source before it is incident onto said objective lens, wherein said magneto-optical recording medium includes:

a readout layer which is predominant in in-plane magnetization at room temperature, and in which a transition occurs to be predominant in perpendicular magnetization as temperature thereof is raised; and a recording layer for recording thereon information using a perpendicular magnetization;

wherein said magneto-optical recording medium is a magneto-optical disk, said light interrupting member which is substantially formed in a rectangular shape interrupts a central portion of the light beam, and a lengthwise direction thereof is set along a radial direction of said magneto-optical disk, and in-plane magnetization in said readout layer is maintained in said readout layer even when temperature thereof is raised due to a side robe generated in a track direction of said magneto-optical disk by said light interrupting member;

wherein a width of said light interrupting member is set within 0.15–0.25 times a diameter of the light beam.

13. The magneto-optical recording and reproducing device as set forth in claim 12, wherein the width is set 0.2 times the diameter of the light beam.

14. The magneto-optical recording and reproducing device as set forth in claim 1, wherein said magneto-optical recording medium is a magneto-optical disk whereon grooves for recording thereon information are formed in a peripheral direction of said magneto-optical disk.

15. The magneto-optical recording and reproducing device as set forth in claim 1, wherein said magneto-optical recording medium is a magneto-optical disk whereon lands for recording thereon information are formed in a peripheral direction of said magneto-optical disk.

16. The magneto-optical recording and reproducing device as set forth in claim 3, wherein said magneto-optical recording medium further includes a radiating film formed on said recording layer so as to confront said readout layer via said recording layer.

17. The magneto-optical recording and reproducing device as set forth in claim 16, wherein said radiating film of said magneto-optical recording medium is made of aluminum.

18. The magneto-optical recording and reproducing device as set forth in claim 1, wherein said magneto-optical recording medium is a magneto-optical disk whereon grooves are formed in a peripheral direction and lands are respectively formed between the grooves; and said readout layer and said recording layer are formed both on the grooves and the lands.

19. The magneto-optical recording and reproducing device as set forth in claim 18, wherein the grooves and the lands of said magneto-optical recording medium are formed so as to have a same width.

20. The magneto-optical recording and reproducing device as set forth in claim 18, wherein the grooves and the lands of said magneto-optical recording medium are formed in a radial direction at a pitch of 0.8 μm to 1.6 μm.

* * * * *